(12) United States Patent
Itoh et al.

(10) Patent No.: US 7,066,387 B2
(45) Date of Patent: Jun. 27, 2006

(54) SERVICE TICKET ISSUING SYSTEM AND SERVICE TICKET ISSUING SERVICE

(75) Inventors: Yoshihiro Itoh, Tokyo (JP); Toshitake Mashiko, Yokohama (JP); Akihiko Yamada, Tokyo (JP); Masayuki Ao, Tokyo (JP)

(73) Assignee: Kabushiki Kaisha Sega, Tokyo (JP)

( * ) Notice: Subject to any disclaimer, the term of this patent is extended or adjusted under 35 U.S.C. 154(b) by 0 days.

(21) Appl. No.: 09/964,754

(22) Filed: Sep. 28, 2001

(65) Prior Publication Data

US 2002/0088853 A1 Jul. 11, 2002

(30) Foreign Application Priority Data

Sep. 30, 2000 (JP) .......................................... 2000-338311
Mar. 26, 2001 (JP) .......................................... 2001-088865

(51) Int. Cl.
*G06K 5/00* (2006.01)

(52) U.S. Cl. ........................................................ 235/382

(58) Field of Classification Search ................ 235/382, 235/380–381, 487, 375, 383; 705/14, 26, 705/80; 380/52, 28, 49, 59; 340/825; 364/401, 364/410

See application file for complete search history.

(56) References Cited

U.S. PATENT DOCUMENTS 5,373,440 A * 12/1994 Cohen et al. ................ 273/139
5,534,857 A * 7/1996 Laing et al. ................. 235/380

(Continued)

FOREIGN PATENT DOCUMENTS

| JP | 2002-199503 | * | 6/2000 |
|---|---|---|---|
| JP | 2001351001 A | * | 12/2001 |
| JP | 2002-207907 | * | 7/2002 |
| WO | WO 94/24820 A | | 10/1994 |
| WO | WO 97/21200 A | | 6/1997 |
| WO | 8-16740 | | 1/1999 |
| WO | WO 99/09502 | | 2/1999 |
| WO | 11-66035 | | 3/1999 |
| WO | 11-203561 | | 7/1999 |
| WO | WO 99/52051 A | | 10/1999 |
| WO | 11-328269 | | 11/1999 |
| WO | WO 00/03328 | * | 1/2000 |
| WO | 2000-56721 | | 2/2000 |
| WO | 2000-67312 | | 3/2000 |
| WO | 2000-105844 | | 4/2000 |
| WO | 2000-184087 | | 6/2000 |

OTHER PUBLICATIONS

International Search Report mailed Dec. 18, 2001.
"Mobile Internet Saizensen I Mode kara Ji–Sedai System IMT2000 Made", Nikkei BP K.K. (Japan), Sep. 14, 2000, pp. 42–49 (ISBN 4–8222–1381–1) (CSNY2001–00275–001).
Communication enclosing Supplementary European Search Report from the European Patent Office mailed on Mar. 21, 2005, In Application No. EP 01972598.

*Primary Examiner*—Thien M. Le
*Assistant Examiner*—Edwyn Labaze
(74) *Attorney, Agent, or Firm*—Finnegan, Henderson, Farabow, Garrett & Dunner, L.L.P.

(57) ABSTRACT

A service ticket issuing system and service ticket issuing service are implemented by various communication terminals. A plurality of game devices 1001 to 100n are connected to the Internet IN, and the Internet IN is connected to a data supply center DSC which issues service tickets. The data supply center DSC is connected to a plurality of service providers SSC1 to SSCm via a communication line. For example, a user of the game device 1001 brings a backup memory 1131 with data of the service ticket stored therein to any of service providers SSC1, and presents the data to the service provider SSC1.

17 Claims, 26 Drawing Sheets

U.S. PATENT DOCUMENTS

| | | | | |
|---|---|---|---|---|
| 5,665,951 A | * | 9/1997 | Newman et al. | 235/375 |
| 5,753,898 A | * | 5/1998 | Hekstra | 235/380 |
| 5,855,007 A | * | 12/1998 | Jovicic et al. | 705/14 |
| 5,859,913 A | * | 1/1999 | Goreta et al. | 235/380 |
| 5,905,246 A | * | 5/1999 | Fajkowski | 235/375 |
| 5,948,040 A | * | 9/1999 | DeLorme et al. | 701/201 |
| 5,979,757 A | * | 11/1999 | Tracy et al. | 235/383 |
| 6,055,513 A | * | 4/2000 | Katz et al. | 705/26 |
| 6,336,099 B1 | * | 1/2002 | Barnett et al. | 705/14 |
| 6,360,254 B1 | * | 3/2002 | Linden et al. | 709/219 |
| 6,370,578 B1 | * | 4/2002 | Revashetti et al. | 709/224 |
| 6,385,591 B1 | * | 5/2002 | Mankoff | 705/14 |
| 6,385,729 B1 | * | 5/2002 | DiGiorgio et al. | 713/201 |
| 6,491,217 B1 | * | 12/2002 | Catan | 235/375 |
| 6,505,773 B1 | * | 1/2003 | Palmer et al. | 235/380 |
| 6,658,415 B1 | * | 12/2003 | Brown et al. | 707/10 |
| 6,736,322 B1 | * | 5/2004 | Gobburu et al. | 235/462.46 |
| 6,829,478 B1 | * | 12/2004 | Layton et al. | 455/428 |
| 2002/0004746 A1 | * | 1/2002 | Ferber et al. | 705/14 |
| 2002/0032604 A1 | * | 3/2002 | Watanabe et al. | 705/14 |
| 2002/0060246 A1 | * | 5/2002 | Gobburu et al. | 235/462.46 |
| 2002/0091569 A1 | * | 7/2002 | Kitaura et al. | 705/14 |
| 2002/0095333 A1 | * | 7/2002 | Jokinen et al. | 705/14 |
| 2002/0116271 A1 | * | 8/2002 | Mankoff | 705/14 |
| 2002/0117544 A1 | * | 8/2002 | Wolf et al. | 235/383 |
| 2003/0184430 A1 | * | 10/2003 | Kumar | 340/5.2 |
| 2003/0233276 A1 | * | 12/2003 | Pearlman et al. | 705/15 |

* cited by examiner

FIG.13

THE EFFECTIVE TERM OF THE FOLLOWING
COUPON WILL EXPIRE SOON.
IF YOU NEED THE FOLLOWING COUPON,
PLEASE DOWNLOAD IT AGAIN.

DOWNLOADED: 2000, 6/30 - '00
EFFECTIVE TERM: 10 DAYS

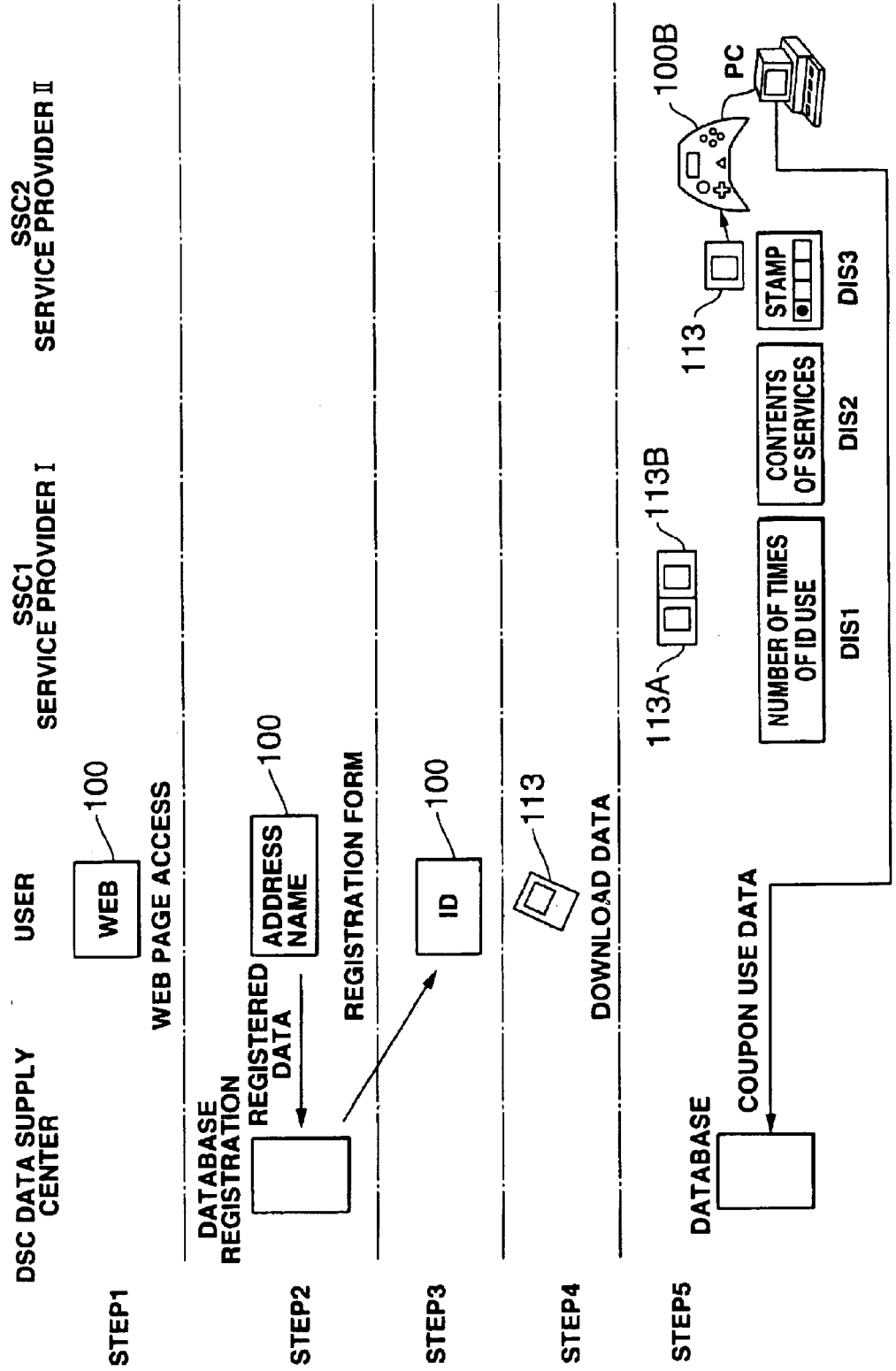

SERVICE TICKET ISSUING SYSTEM AND SERVICE TICKET ISSUING SERVICE

BACKGROUND OF THE INVENTION

1. Field of the Invention

The present invention relates to a service ticket issuing system and a service ticket issuing service.

2. Description of the Related Art

As Internet use has become widespread, various new services have been developed. For example, in the service industry, for example, restaurants or leisure facilities offer services to treat printouts of web pages as service tickets. Such service tickets are issued on the precondition that there is a communication terminal to which a printer can be connected. Accordingly, the applicability of such communication terminals is limited.

SUMMARY OF THE INVENTION

Against this backdrop, the present invention was devised. It is an object of this invention to provide a service ticket issuing system and service ticket issuing service to which communication terminals of a wider range can be applied.

Concerning the service ticket issuing system and service ticket issuing service of this invention, data which can be downloaded through a communication line by a user by using a communication terminal contains an identification indicator, and this data is treated as a service ticket. Accordingly, it is possible to use a variety of communication terminals.

Concerning this invention, the communication terminal may be specified in advance and prohibited from downloading the same data repeatedly. The communication terminal may generate the identification indicator. Therefore, it is possible to prevent the unfair use of service tickets and to contribute to sales promotion of the communication terminal.

Concerning this invention, the communication terminal may be a game device, and the data may be a game performed on this game device. Moreover, the value of the service ticket may be changed. For example, a data supplier may set the value of the service ticket at random and change it according to the registration conditions (sex, address, and the number of access times) of the user or to the results of a game. Accordingly, the user can enjoy the feeling of participating in a game or lottery and the benefits of the service ticket. Moreover, by setting an effective term for the service ticket, it is possible to prevent useless accumulation of coupons and to enhance the user's motivation to use the service tickets.

Concerning this invention, a carrier capable of retaining data as the service ticket may be specified. A service provider may be specified, who provides a service corresponding to the service ticket. The service provider may have equipment, such as a game device, to which the carrier can be connected. The equipment may be the type capable of identifying the identification indicator. This will guarantee the fair use of the service ticket and can contribute to attracting customers to the service provider. Furthermore, the carrier may display a bar code for indicating the coupon and the equipment may comprise a bar code reader. This makes it possible to make full use of a bar code system which is widely utilized.

A service method of this invention comprises: a server for a service provider to manage user information and to deliver contents requested by a user; an information processing terminal having storage means for storing the contents and display means for displaying an image on a screen by using image data contained in the contents; a service providing terminal having matching means for reading user data contained in the contents stored in the information processing terminal and for matching that user data with user data in the server, determining means for determining an appropriate user on the basis of the matching, means for providing a specified service to the user when the determining means identifies the user as an appropriate user, sending means for sending service completion information to the server at the time of confirmation of the completion of the service, and means for deleting the contents of the completed service in the information processing terminal; wherein the user brings the information processing terminal to a service facility where the service providing terminal is provided, and the service providing terminal provides the user with a service according to the contents stored in the information processing terminal. By this service method, the service is properly provided.

This invention is a service providing system for providing a specified service by registering personal information of a user at a server by utilizing a communication terminal. The server comprises means for creating an enciphered bar code by specifying a given service content from the user's personal information, and means for delivering image data including the bar code to the user. The communication terminal comprises storage means for storing the delivered image data and display means for displaying the image data. At a service providing facility where an information processing terminal having the bar code is provided, the user causes the information processing terminal by means of the bar code reader to read the bar code contained in the image data displayed on the display means of the communication terminal, and the information processing terminal recognizes the specified user and the service content according to the bar code, performs the processing to provide a service according to the service content, sends new personal information generated by the service to the server, and updates the personal information of the user so that the new personal information is reflected in the service content at the time of the next delivery. Accordingly, it is possible to make full use of the bar code and to provide optimum and original service for each user.

Concerning the service providing system of this invention, the server has specified information registered therein according to a plurality of products, wherein at the service providing facility comprising a plurality of products, each having a bar code displayed thereon, and a bar code reader capable of reading the bar code and sending it to the server, the user causes the bar code reader to read the bar code displayed on a product selected from the products and to send it to the server, and wherein on the basis of the received bar code, the server identifies the specified product among the registered products, creates a bar code enciphering a specified service content regarding this product, and sends image data containing the bar code to the user. Accordingly, it is possible to keep track of the user's purchasing state in real time and to provide optimum service.

Moreover, this invention is a machine readable storage medium having a program stored therein for causing a computer to download the service ticket. The term "storage medium" herein used means the medium which has information (mainly digital data or programs) stored therein by some kind of physical means and is capable of causing processing units such as computers or special purpose processors to perform specified functions. In other words, the storage medium may be the medium capable of downloading programs onto computers by whatever means and causing the computers to perform specified functions. Examples of the storage medium include flexible disks, fixed disks, magnetic tapes, magneto-optical disks, CDs, CD-ROMs, CD-Rs, DVD-RAMs, DVD-ROMs, DVD-Rs, PDs, MDs, DCCs, ROM cartridges, RAM memory cartridges with battery back-up, flash memory cartridges, and nonvolatile RAM cartridges. The storage medium also includes the medium by which transferred data is received from a host computer through cable or wireless communication lines (such as public circuits, data leased circuits, or satellite circuits). So-called "Internet" is also included in this storage medium.

BRIEF DESCRIPTION OF THE DRAWINGS

FIG. 13 is a conceptual drawing illustrative of still another picture image.

FIG. 14 is a conceptual drawing illustrative of the entire flow of the service ticket issuing service.

DETAILED DESCRIPTION OF THE PREFERRED EMBODIMENTS

Embodiment 1

An explanation is hereinafter given about preferred Embodiment 1 of this invention with reference to the attached drawings.

Communication Terminal

Figure 1:
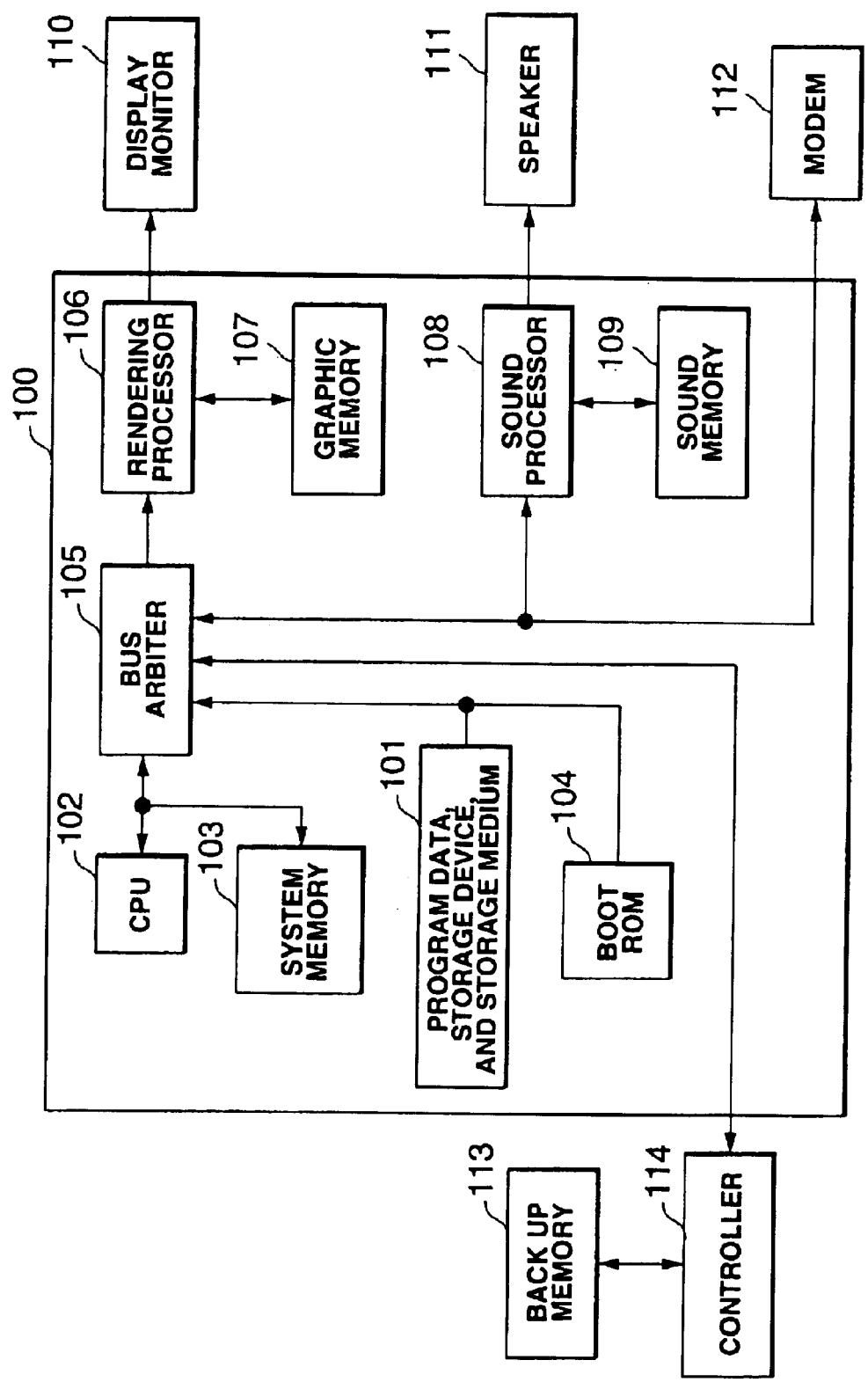
FIG. 1 is a block diagram of a communication terminal according to Embodiment 1 of the present invention.

FIG. 1 is a block diagram of a communication terminal of the service ticket issuing system and the service ticket issuing service. This communication terminal is constructed as a game device.

The service ticket herein used means tickets, coupons, discount tickets, complimentary tickets, stamps for indicating the number of times of use, and other concepts including any indicators that have an influence on the contents of the services.

A game device 100 comprises: a program data storage device or storage medium (including an optical disk and an optical disk drive) 101 which stores game programs and data (including graphic and music data); a CPU 102 for conducting, for example, coordinate calculation for the running of game programs, and the control of the entire system and the image display; a system memory 103 with programs and data stored therein necessary for the CPU 102 to perform processing; a BOOT ROM 104 with programs and data stored therein necessary for activating the game device 100; and a bus arbiter 105, for controlling the flow of programs and data among each block of the game device 100 and equipment connected externally. These components are connected to a bus (not shown in the drawing).

The bus is connected to a rendering processor 106. This rendering processor 106 causes graphic (movie) data read from the program data storage device or storage medium 101 or picture images to be generated in accordance with the player's operations or the progress of the game to be displayed on a display monitor 110. Graphic data or other data necessary for the rendering processor 106 to generate picture images is stored in a graphic memory 107.

The bus is connected to a sound processor 108. The sound processor 108 causes a speaker 111 to output music data read from the program data storage device or storage medium 101, and to output sound effects or sounds to be generated by the player's operations or in accordance with the progress of the game. Sound data and other data necessary for the sound processor 108 to generate sound effects or sounds are stored in a sound memory 109.

The game device 100 is connected to a modem 112 and thereby can conduct communications through telephone lines (not shown in the drawing) with other game devices 100 or network servers. The game device 100 is further connected to: a backup memory 113 (including a disk storage medium or storage device) for storing information about the game in progress as well, as program data which is input and output through the modem; and a controller 114 for inputting, into the game device 100, information for controlling the game device 100 and the equipment connected externally (not shown in the drawings) in accordance with the player's operations.

The backup memory 113 is capable of storing a variety of data captured by the game device 100 through the modem 112 and serves as a data carrier for the service ticket issuing system. With the game device 100, it is possible to prevent the unauthorized use of the service tickets, for example, by prohibiting duplicate downloading of data.

If the downloaded data is a small-sized game and the back-up memory 113 is structured so that it can perform the game, a user can enjoy the game while acquiring the service tickets, and it is also possible to establish a link between the value of the service tickets and the game results, thereby adding the entertaining aspects of games to the service ticket service.

Moreover, if it is specified into which equipment or carrier the service tickets can be downloaded, it is possible to contribute to the sales promotion of such equipment or the like.

Needless to say, as the communication terminal, personal computers, cellular phones, electronic notepads, mobile gear, or any other communication terminals can be used.

Since the distribution of the service tickets corresponds to the delivery of information, it is also possible to realize paperless advertisements.

Forced delivery of advertisements of time-limited services or products to the communication terminal such as a cellular phone makes the user, such as a game player, of the communication terminal feel "eager" to receive the services or to purchase the products, and strongly stimulates the user's appetite for buying. This will bring about the effect of great sales promotions.

If an effective term is set for the advertising data and the data is automatically deleted at the time of expiration of the effective term, useless data will not be accumulated, which is highly convenient for users. Needless to say, the setting similar to that described above may be applied to the service tickets.

Figure 2:
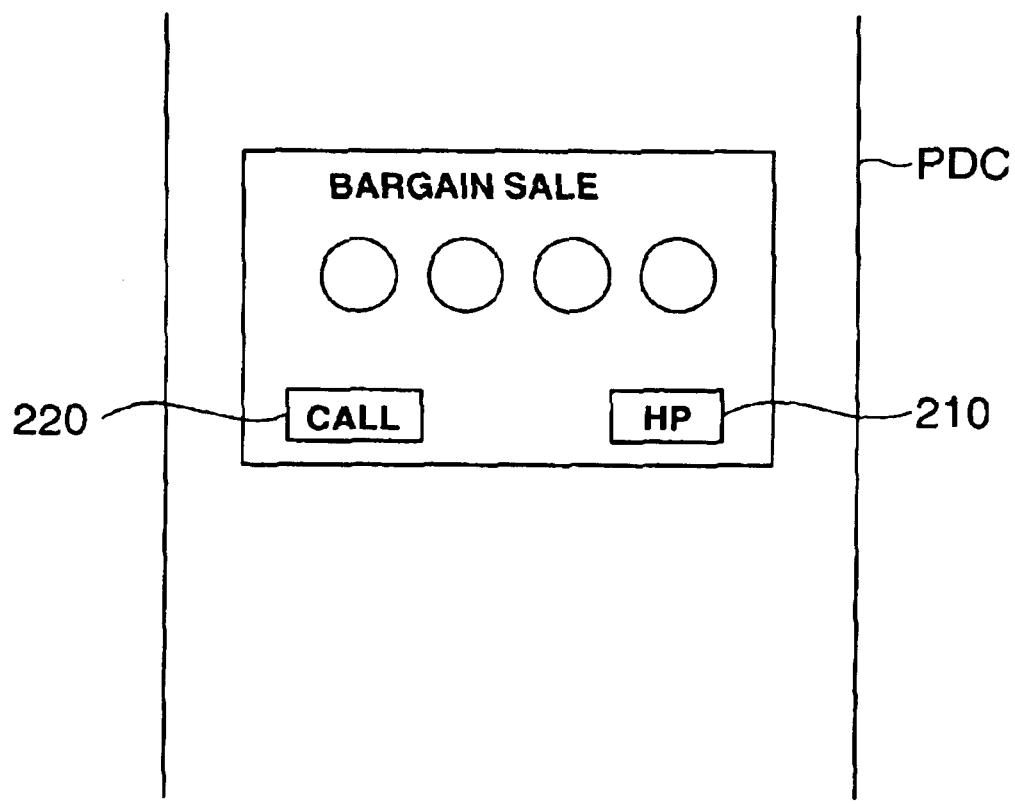
FIG. 2 is a front view of an advertisement displayed on the communication terminal of Embodiment 1.

FIG. 2 illustrates an example of delivered data of an advertisement of, for example, a shop. The advertisement is displayed on a screen of a cellular phone:PDC. On the screen are provided a banner 210 which enables access to the indicated home page, and a banner 220 for making a phone call to the shop. When the banner 210 is selected by point pick, the home page of the shop will be opened. When the banner 220 is selected by point pick, the cellular phone PDC will be connected to a sales contact of the shop, thereby enabling a direct call. Accordingly, the user can immediately talk with a sales clerk and it is possible to promptly confirm the products and make arrangements for the purchase.

Backup Memory

Figure 3A:
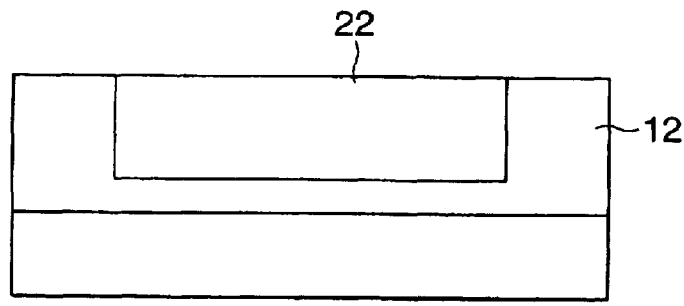
FIG. 3A is a top view of a backup memory.
Figure 3B:
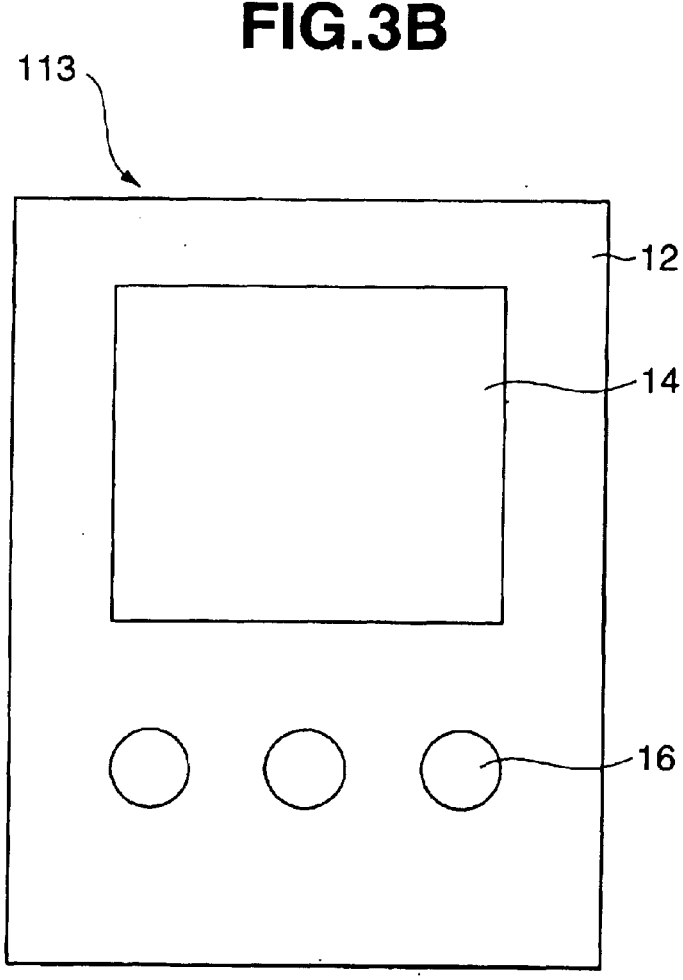
FIG. 3B is a front view of the backup memory.
Figure 3C:
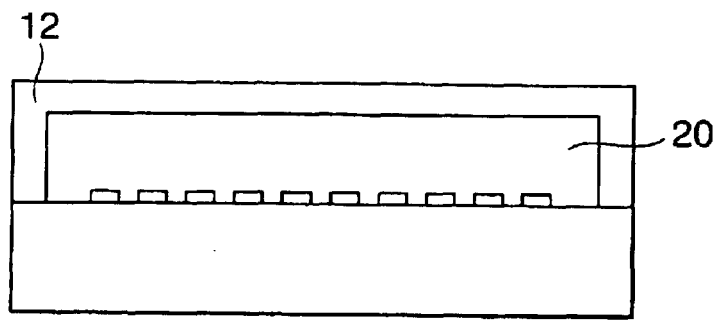
FIG. 3C is a bottom view of the backup memory.
Figure 3D:
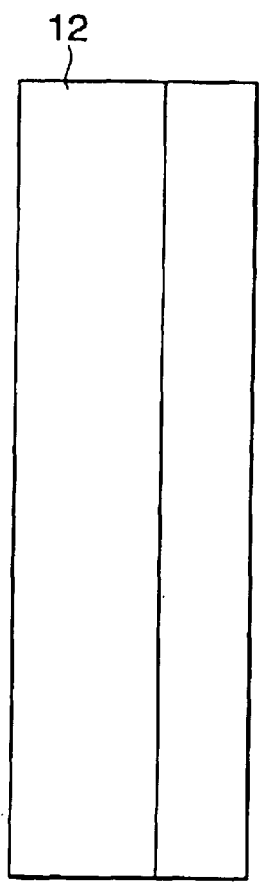
FIG. 3D is a right side view of the backup memory.
Figure 3E:
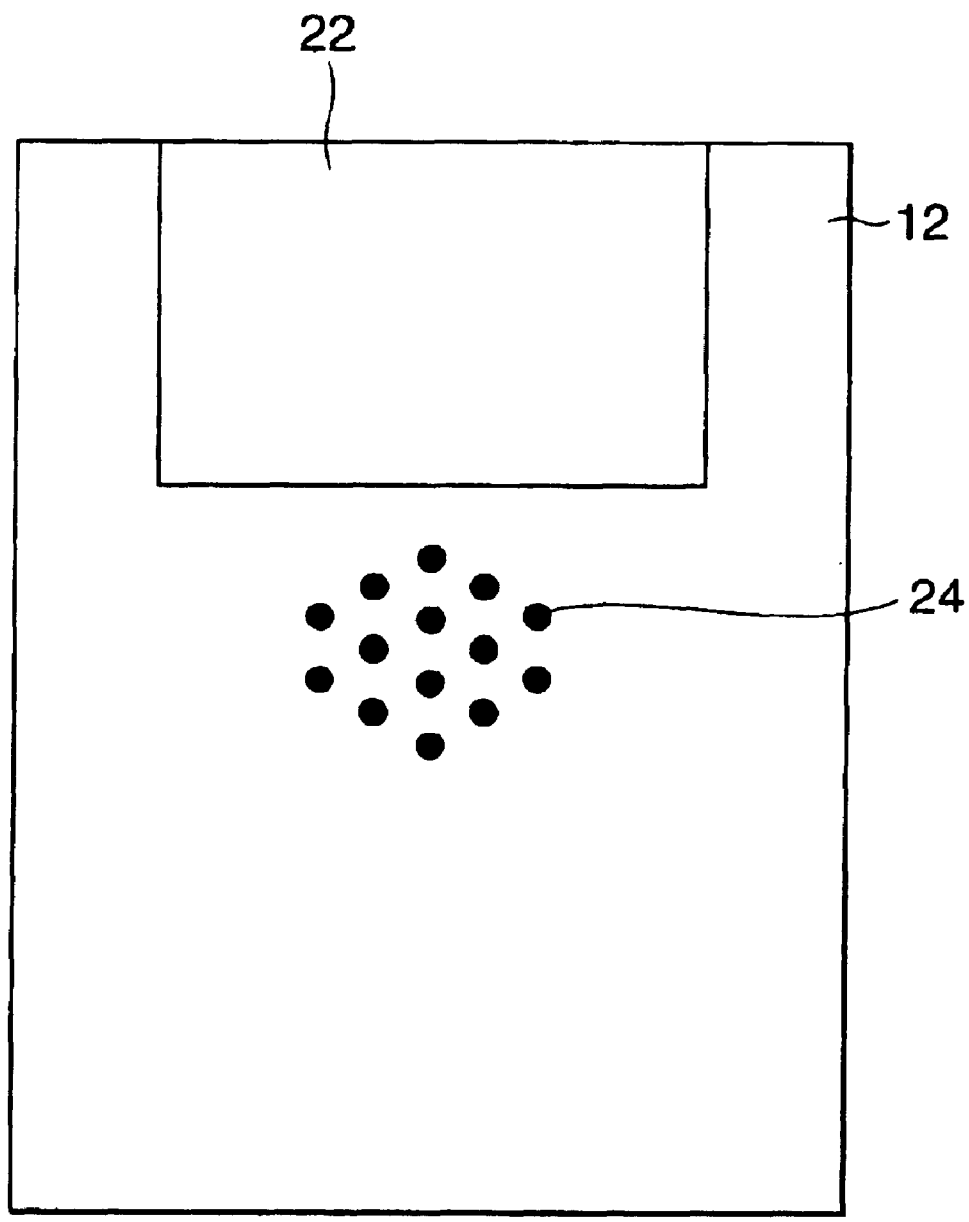
FIG. 3E is a rear view of the backup memory.
Figure 4A:
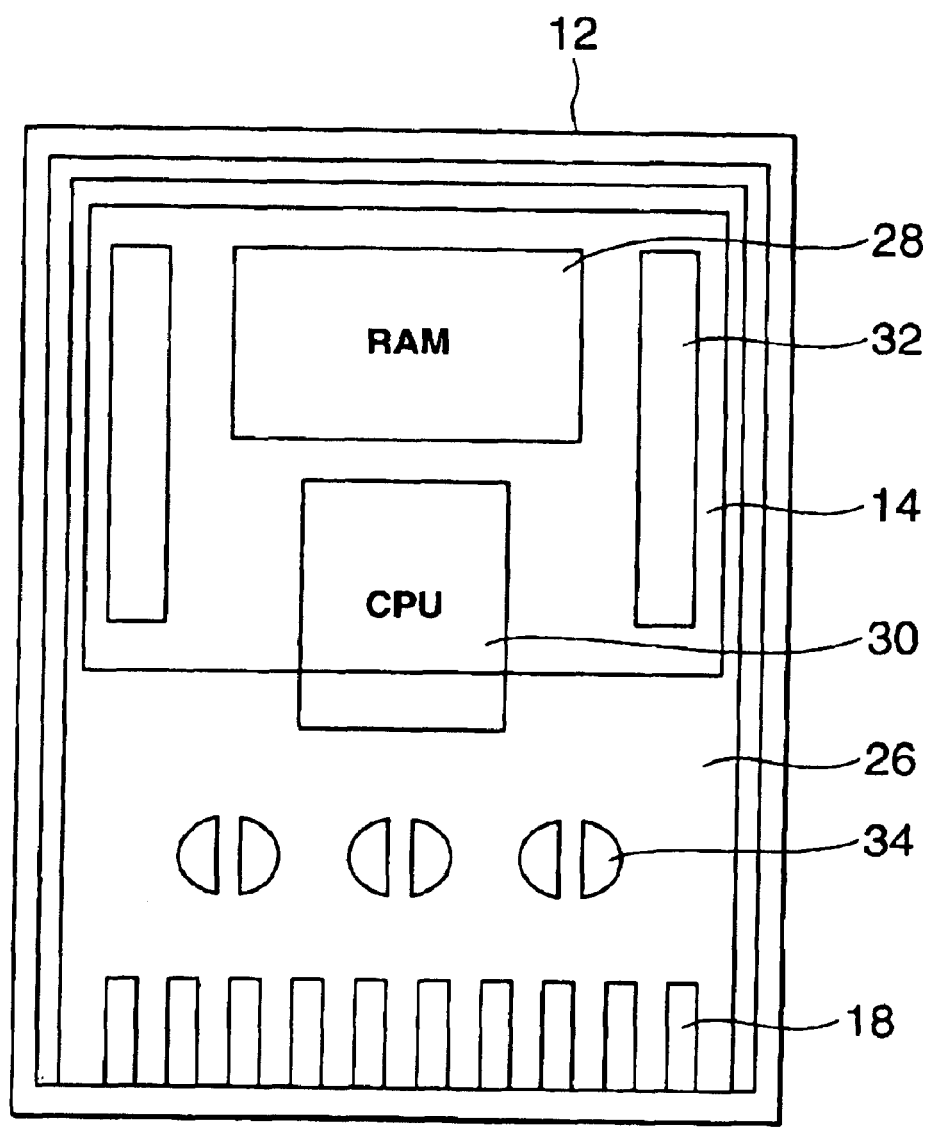
FIG. 4A is a front view of the internal structure of the backup memory.
Figure 4B:
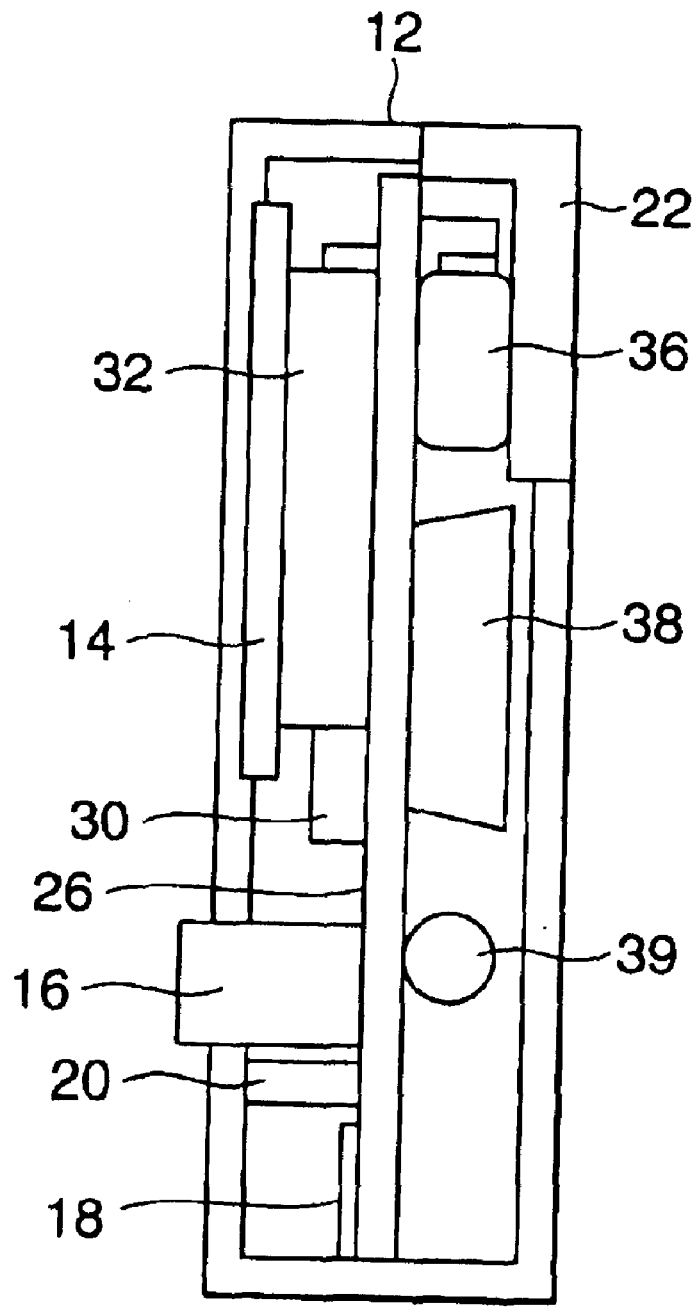
FIG. 4B is a side view of the internal structure of the backup memory.
Figure 5:
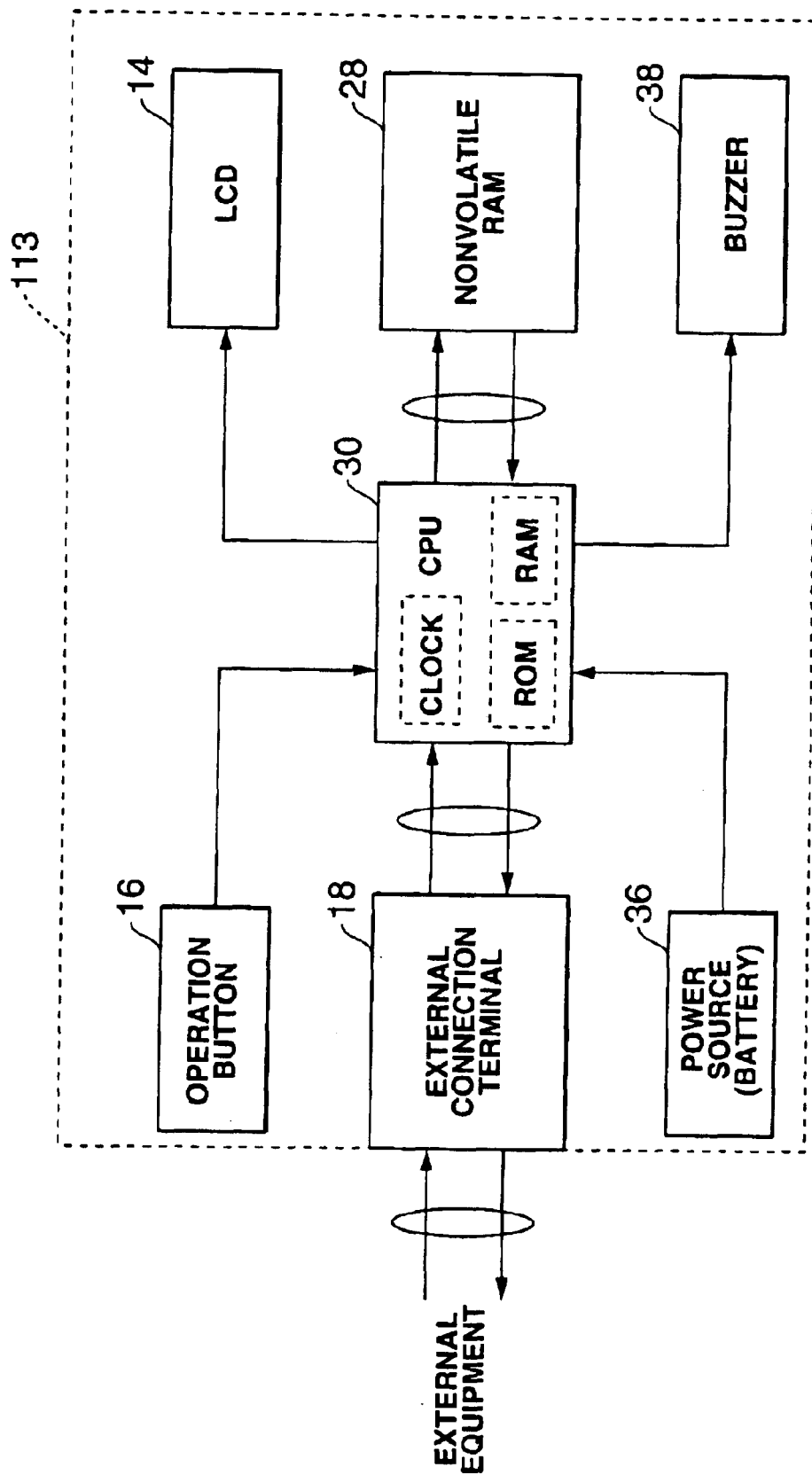
FIG. 5 is a block diagram of the backup memory.

FIGS. 3A through 3E, FIGS. 4A and 4B, and FIG. 5 illustrate an example of the backup memory. FIG. 3A is a top view of the backup memory, FIG. 3B is its front view, FIG. 3C is its bottom view, FIG. 3D is its right side view, FIG. 3E is its rear view, FIG. 4A is a front view of its internal structure, FIG. 4B is a side view of its internal structure, and FIG. 5 is its block diagram.

As shown in FIGS. 3A to 3E, the backup memory 113 has a small LCD (liquid crystal display) 14 in the upper part of the surface of a case 12, and there are operation buttons 16 below the LCD 14 (FIG. 3B). At the front-side lower end of the case 12 is provided an external connection terminal 18 for connecting to external equipment such as the game device, and at the back of the external connection terminal 18 there is a shutter 20 for protecting internal circuits from, for example, outside dust (FIG. 3C). In the back-side upper part of the case 12 is formed a battery receiving space 22, and buzzer sound holes 24 described later are made in the case at a position below the battery receiving space 22 (FIG. 3E).

The backup memory 113 has the internal structure as illustrated in FIGS. 4A and 4B. Within the case 12, a printed circuit board (PCB) 26 is provided for mounting various kinds of electronic components. On the front side of the PCB 26 are mounted a nonvolatile RAM 28 for storing information, and a CPU 30 for controlling the entire backup memory. On the right and left sides of the nonvolatile RAM 28 and the CPU 30 on the front side of the PCB 26, two pieces of conductive rubber 32 are mounted. The LCD 14 is mounted over the conductive rubber 32. At positions lower than the CPU 30 over the surface of the PCB 26, button contacts 34 of the operation buttons 16 are provided. At a position lower than the button contacts 34 over the surface of the PCB 26 is formed the external connection terminal 18.

On the back of the PCB 26, there is a battery 36, a power source of the backup memory 113. At a position lower than the battery 36 is provided a buzzer 38, and at a position lower than the buzzer 38 is provided a quartz resonator 39.

FIG. 5 illustrates a block diagram of the backup memory 113. The operation buttons 16, the LCD 14, the external connection terminal 18, the nonvolatile RAM 28, the battery 36, and the buzzer 38 are connected to the CPU 30 which controls the entire backup memory 113. The CPU 30 contains ROM and RAM. The external connection terminal 18 is connected to external equipment (not shown in the drawing).

The CPU 30 controls the entire backup memory 113. The ROM contained in the CPU 30 stores basic control programs, and the RAM contained in the CPU 30 is used as a temporary memory for running the programs. The nonvolatile RAM 28 is a memory for storing backup data to be saved. However, programs for running, for example, games, are also stored in a part or all of the nonvolatile RAM 28 as necessary.

Entire Structure

Figure 6:
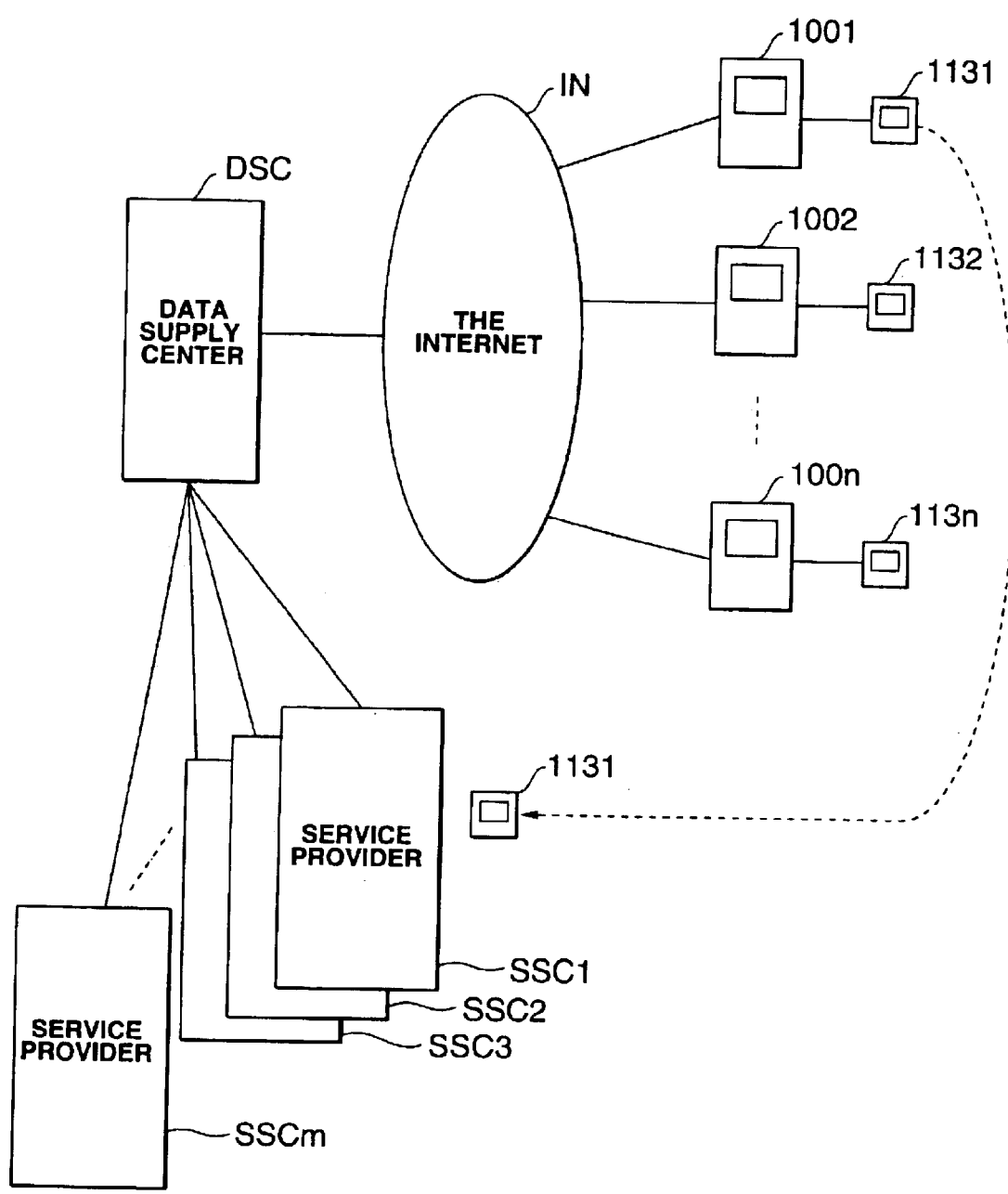
FIG. 6 is a block diagram of the entire structure of Embodiment 1.

FIG. 6 illustrates the state in which a plurality of game devices 1001 to 100n (a plurality of the same devices as the game device 100 exist) are connected to the Internet IN, to which a data supply center DSC for issuing service tickets is connected. A plurality of service providers SSC1 to SSCm are connected through communication lines to the data supply center DSC. For example, a user of the game device 1001 brings a backup memory 1131 with service ticket data stored therein to any of the service providers (for example, SSC1).

Regarding the service providers SSC1 to SSCm who offer services corresponding to the service ticket, they can benefit from the service tickets attraction of customers.

Details of the Services

The service providers SSC1 to SSCm can provide various services as indicated in the following examples:

(a1) A service to allow free use of arcade games.

(a2) A service to allow sample playing of arcade games. Specifically, a user can play a part of one game for free, but can only continue to play the game to the end by adding, for example, coins.

(a3) A service to offer, for example, medals for winning arcade games.

(a4) A service offering free or discount admission to amusement centers.

Figure 7:
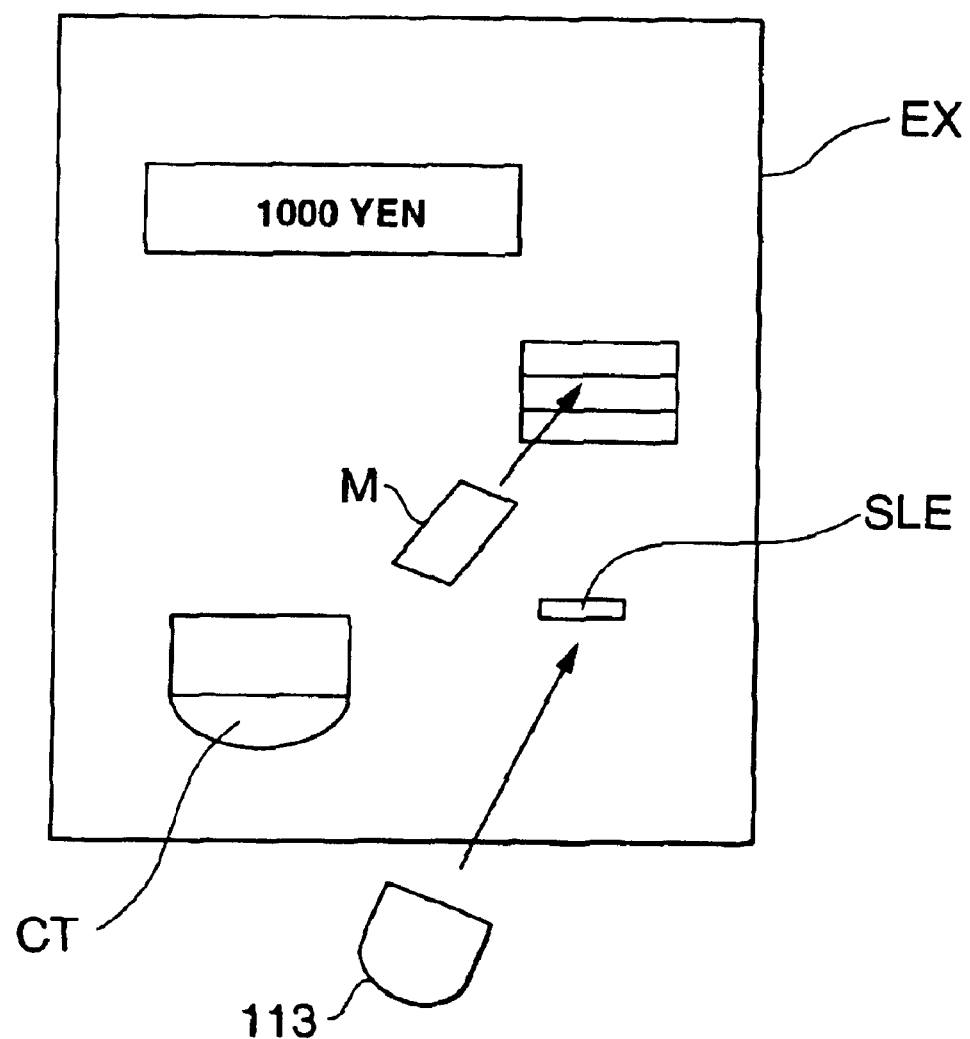
FIG. 7 is a front view of a money changer of Embodiment 1.
Figure 8:
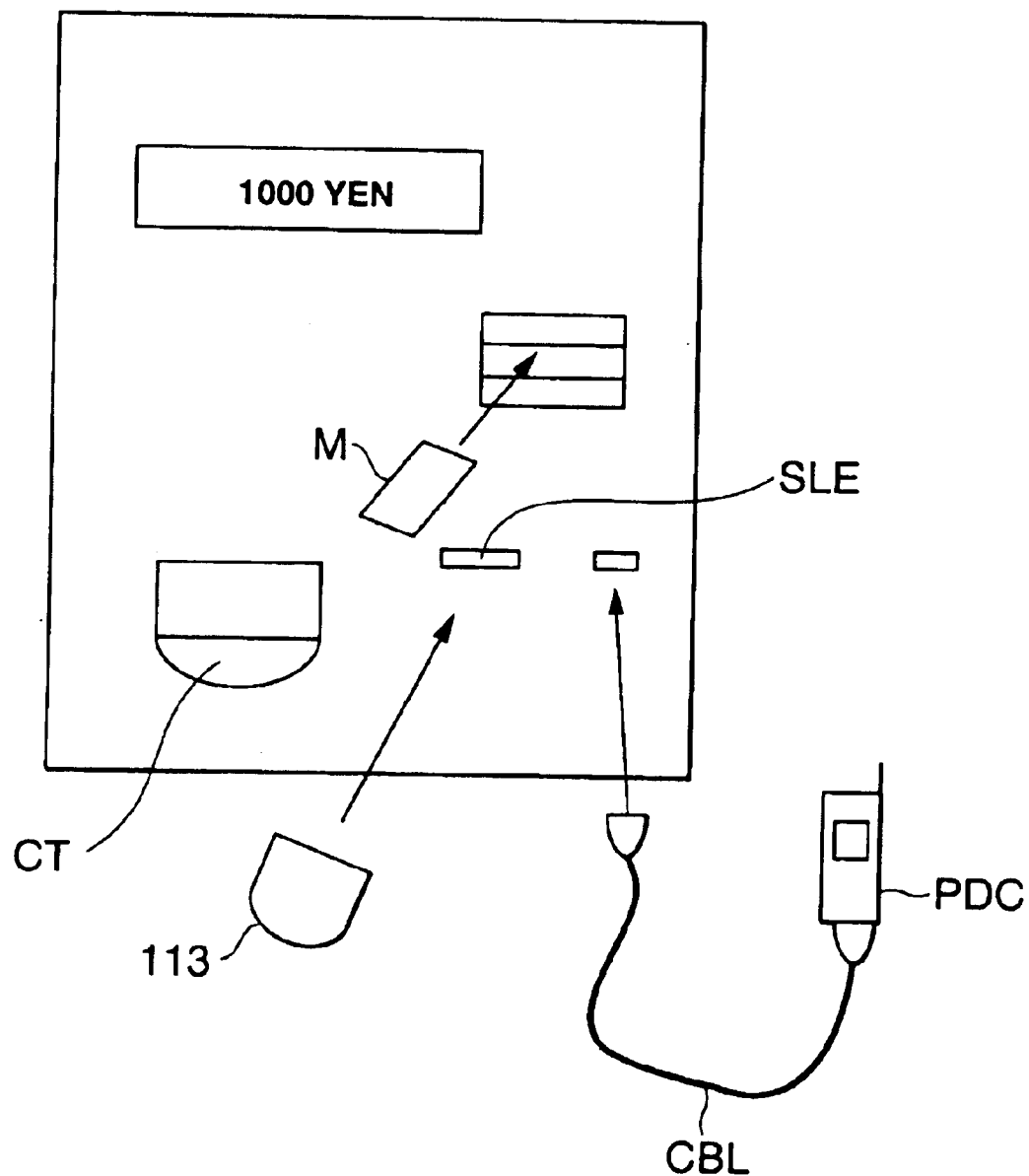
FIG. 8 is a block diagram of another money changer of Embodiment 1.

(a5) With a money changer EX for converting paper money M into coins to be used for games, as shown in FIG. 7, when the backup memory 113 is connected to a slot SLE and paper money M is inserted into the money changer EX, coupons are registered in the backup memory 113 for the number of times more than (for example, by one time) that corresponding to the amount of the paper money M. Since no money exchange is conducted at this time, no coin is supplied. In the normal money exchange, coins are supplied to a coin tray CT. Then, the user can carry the backup memory 113 as a substitute for his/her change purse and enjoy games without carrying any small change with him/her. If the money changer EX is connected to a server (not shown in the drawing), it is possible to acquire information about the player from the backup memory 113 and to make full use of it for customer management. As shown in FIG. 8, instead of the backup memory 113, a communication terminal such as a cellular phone PDC may be connected through a cable CBL to the money changer EX.

(a6) With the money changer EX for converting paper money M into coins to be used for games, when the backup memory 113 is connected to the slot SLE and paper money M is inserted into the money changer EX, coins (not shown in the drawing) are supplied to the coin tray CT and coupons for a specified number of times (for example, one time) are registered with the backup memory 113. By using the coupons, it is possible to perform a game for free or to perform a sample play of the game. In other words, it is possible to acquire the coupons through money exchange. If the money changer EX is connected to a server (not shown in the drawing), it is possible to acquire information about the player from the backup memory 113 and to make full use of it for customer management. Instead of the backup memory 113, a communication terminal such as a cellular phone PDC may be connected through a cable CBL (a wireless method is also possible).

(a7) A service to sell products at a discount or to provide products at no charge.

(a8) A service to allow the use of the service tickets as tickets. For example, a service to allow admission to various events with the service tickets, or a service to allow the user to ride various amusement park rides.

(a9) A service to allow the use of the service tickets as money.

(a10) A combination of the above-mentioned services.

Value of Service Tickets

The value of the service tickets can be set in various ways as indicated in the following examples, depending on the situation when a user receives data or other conditions:

(b1) The value of the service tickets is changed according to the number of times that data of a specified series is downloaded.

(b2) The data supplied from the data supply center DSC is a game, and the value of the service tickets is changed according to the results of the game when the user plays the game.

(b3) The value of the service tickets is changed according to, for example, a date and time of acquisition of the data.

(b4) The value of the service tickets for the user who has made access is changed according to the total number of access times to the data supply center DSC.

(b5) The value of the service tickets is changed according to the user's specific attributes such as the user's sex, age, zodiac sign of the year of his/her birth, constellation for fortune-telling, and initials of his/her name.

(b6) A discount rate for the service tickets is changed according to, for example, the prices of products purchased by the user and the number of times of such purchase. For example, while a regular discount rate is 5%, a 10% discount rate is offered for the users who frequently purchase products.

(b7) When the service tickets are downloaded, the value of the service tickets is changed on random conditions, for example, by awarding special incentives as lucky service tickets.

(b8) A combination of the above settings.

Moreover, it is possible to offer the following service on the communication terminal.

(b9) A service to distribute special-purpose software capable of downloading more advantageous service tickets when the number of times of downloading the service tickets has reached a specified number.

Effective Term of Coupons

Figure 12:
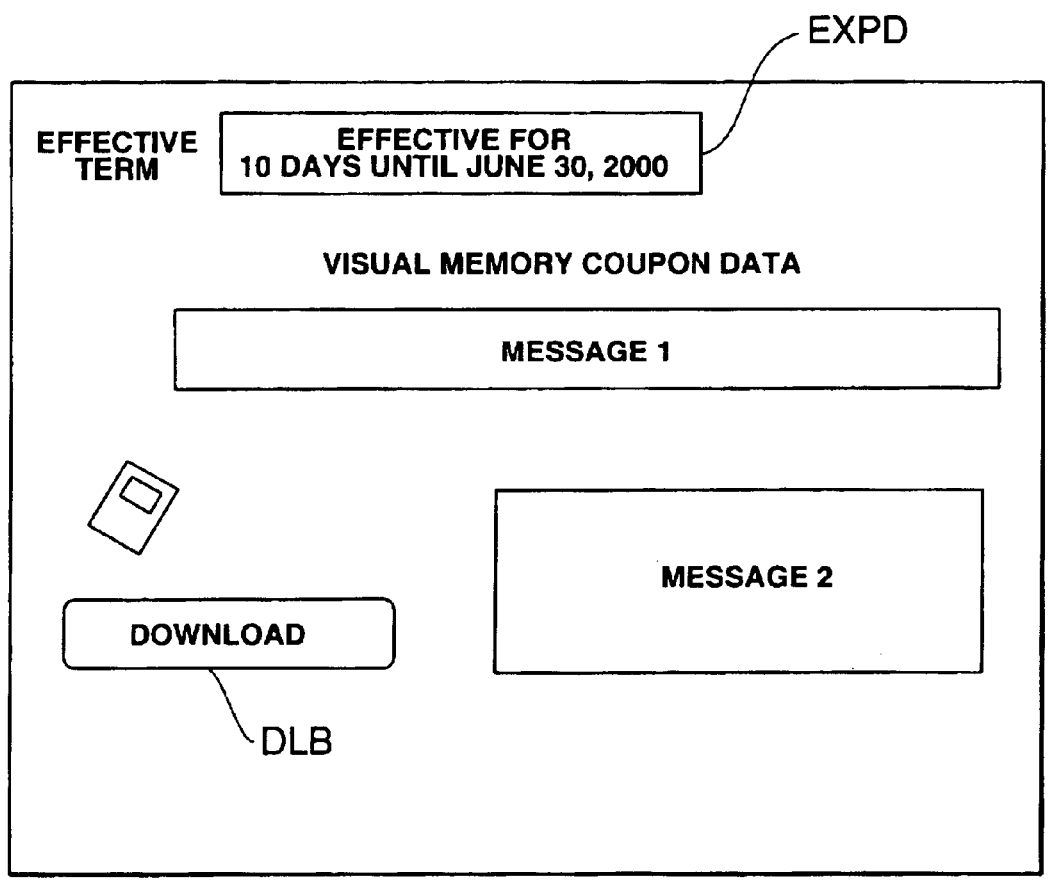
FIG. 12 is a conceptual drawing illustrative of another picture image.

The game device 100 and a portable terminal such as the cellular phone PDC generate the ticking of an internal clock and are capable of time management and, therefore, it is possible to set an effective term for coupons. This prevents useless data from being accumulated, for example, in the backup memory 13. As shown in FIG. 12, for example, when a coupon is downloaded from a home page, the effective term together with the date and time of downloading is displayed on an effective term display EXPD. The management of the effective term is conducted at the time the power is turned on by comparing the current time with effective term time data.

Concerning a coupon with its expiration time in the near future, a message is displayed as shown in FIG. 13 to inform the user that downloading should be conducted as necessary. There is a fear that the user may change the time of the cellular phone in order to extend the time of the coupon, but it is possible to prevent such unfair use by referring to the time of the server at the data supply center DSC. The service ticket with an effective term which will expire soon may be automatically displayed in order to capture the user's attention.

There is a fear with the service tickets made of paper that the users may lose the tickets or forget where they have left the tickets, but there is no such fear with the service tickets in a digital data form.

Identification Indicator of Service Ticket

The data to become the service tickets contains some kind of identification indicator, which makes it possible to identify whether the service provider can provide the service or not. Examples of the identification indicator include: ID supplied by the data supply center to the user; a serial number or other information held by the user's game device; characters, picture images, cipher, and other data contained in the data itself; and the data itself. The service provider SSC has the means for identifying such identification indicators.

Identification

Figure 9:
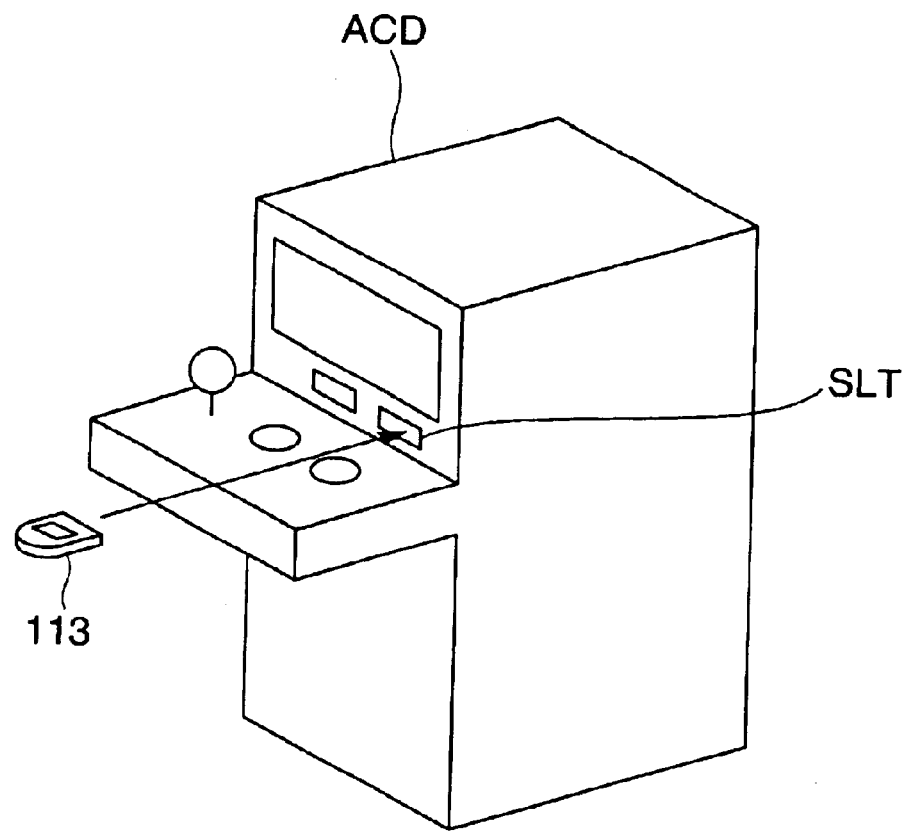
FIG. 9 is a perspective view of an identifying means of Embodiment 1.

As shown in FIG. 9, the service provider SSC is, for example, an amusement center having an arcade game device ACD. This arcade game device ACD has a slot SLT formed therein for inserting the backup memory 113. Since information about the service ticket is previously supplied to the service provider SSC, the arcade game device ACD can determine whether the data stored in the backup memory 113 is the service ticket or not. If the service ticket is consumed, for example, by playing games by using the service ticket, displays of the service ticket (such as 113X in FIG. 15A, 113Y in FIG. 15B, and 113Z in FIG. 15C) may be erased. When the service ticket is consumed, a message saying, for example, "Thank you" is displayed on the backup memory 113 and the backup memory 113 then loses its effect at that time. By downloading the data again, the effect of the service ticket is restored to the state in which the number of times that the backup memory 113 is used is increased by one. The number of times of use is added by repeating the above-described procedure, thereby enabling the user to receive more advantageous service.

Moreover, it is possible to make the setting so that the game results of the arcade game device ACD can be registered with the backup memory 113 to be reflected in the value of the service tickets, and that the game data, etc. can be uploaded onto the server through the Internet IN to be reflected in the user's information.

Figure 10:
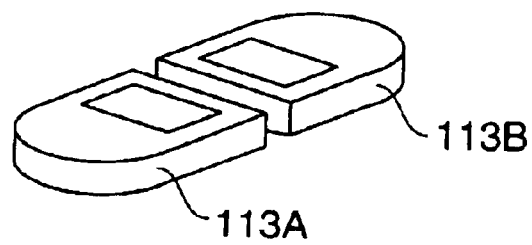
FIG. 10 is a perspective view of another identifying means.

Alternatively, as shown in FIG. 10, a backup memory 113A and a backup memory 113B are made connectable to each other. The identification indicator is identified by connecting the user's backup memory 113A to the service provider's backup memory 113B.

Accordingly, it is possible to adopt various kinds of identification means for identifying the identification indicator. As a method of connecting the data carrier with the identification means, various kinds of methods can be adopted such as wireless, optical, or electromagnetic coupling.

Man-Machine Interface of the Communication Terminal

Figure 11:
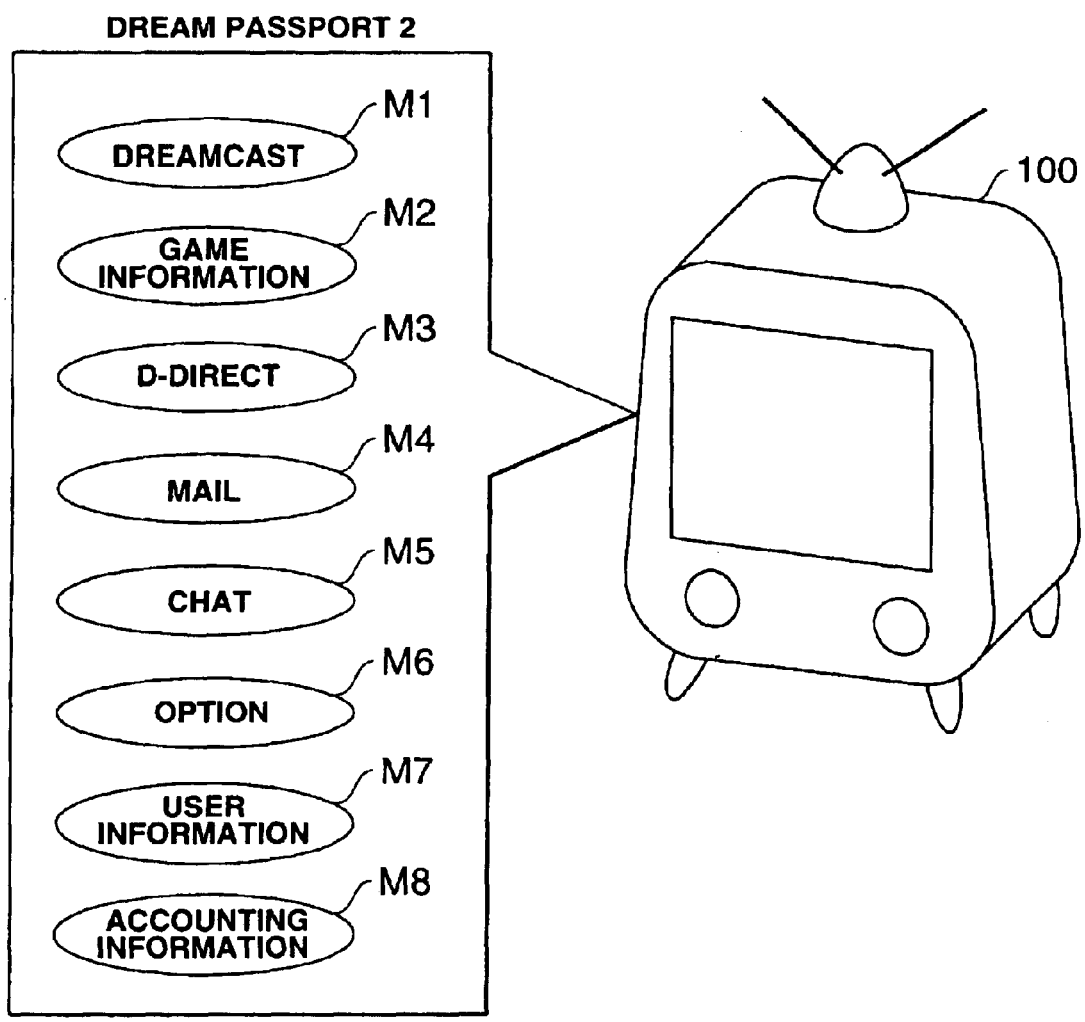
FIG. 11 is a conceptual drawing illustrative of a picture image on the communication terminal of Embodiment 1.

FIG. 11 is a screen image of the game device 100 as the communication terminal, and web pages for the game device 100 are displayed. A menu is displayed on this screen to access various web pages. The following buttons are displayed: button M1 for moving to a home page of entertainment information; button M2 for moving to a game-related home page; button M3 for moving to an Internet shopping location; button M4 for moving to electronic mail; button MS for moving to a chat page; button M6 for moving to options such as environment settings; button M7 for changing the communication settings or the user information; and button M8 for moving to accounting information.

The user selects the button M2, moves to the home page of shop information, and further reaches the home page shown in FIG. 12, thereby downloading the data for the service ticket. On this screen, the following messages are displayed, stating that: if the service ticket data is downloaded to a specified backup memory 113 and if the user brings the backup memory 113 to a specified service provider SSC, the user will receive a specified service (Message 1) and a message of cautions in downloading is displayed (Message 2). A downloading button DLB is also displayed to start downloading.

If the user is required to input his/her personal information upon downloading, it is possible to collect this personal information and marketing information.

The Entire Process

FIG. 14 is a conceptual drawing illustrative of the entire flow from the service ticket issuance to the receipt of the service by the user.

In the first Step 1, the user accesses a web page of the data supply center DSC from the game device 100. In Step 2, the user refers to, for example, regulations of utilization and then registers his/her personal information, such as his/her address and name, on a registration form. This personal information is registered in a database at the data supply center DSC. It is possible to contribute to the service provider's service improvement by acquiring the user's personal information. A password, software, or the like which will enable more advantageous downloading may be offered to the user according to the number of access times, thereby promoting the user's access to the web page.

This can promote the utilization of the web page by the user of the game device 100 and also produce the effect of, for example, expansion of the Internet shopping market.

As described above, by specifying the game device 100 and the backup memory 113, it is possible to enhance the name recognition of the game device and the backup memory, thereby leading to sales promotion. If the user's personal computer, game devices of other companies, or other devices can access the web page, it is possible to promote the access to the web page or the utilization of the service providers by users who do not have the game device 100.

Figure 15A:
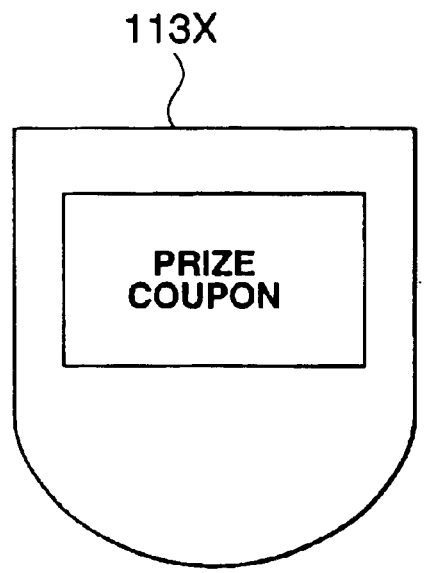
FIG. 15A is a front view of a sample screen display of the backup memory.
Figure 15B:
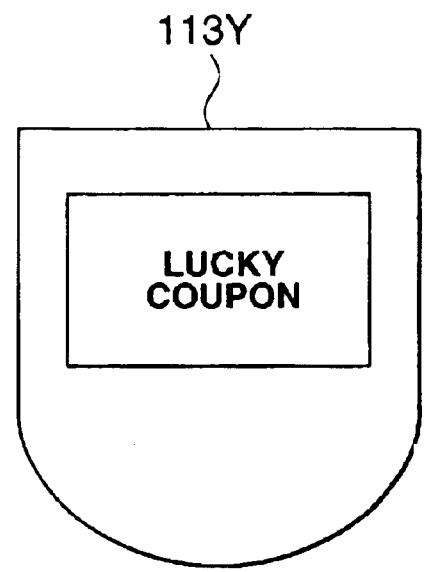
FIG. 15B is a front view of another sample screen display of the backup memory.
Figure 15C:
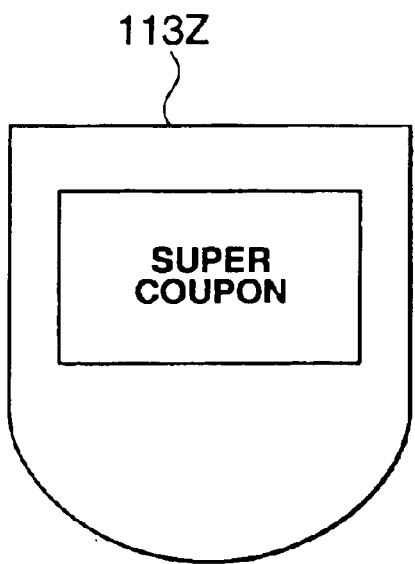
FIG. 15C is a front view of still another sample screen display of the backup memory.
Figure 15D:
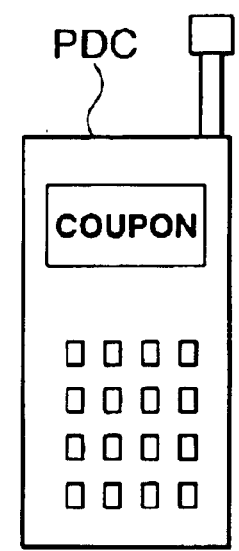
FIG. 15D is a front view of a cellular phone as a data carrier, and a sample screen display thereof.

FIG. 15D illustrates an example in which a cellular phone PDC serves as the data career. As the user accesses the web page through the "I mode" of the cellular phone and acquires the service ticket data, the letters "COUPON" are displayed on the screen. If the cellular phone can be used to access the web page, it is possible to attract many customers. In terms of functionality, the cellular phone PDC corresponds to the game device 100 and the backup memory 113.

In the following Step 3, the data supply center DSC notifies the user of the ID. In Step 4, the user downloads the data which will become the coupon to the backup memory 113. The data to be downloaded is changed according to the number of access times, the time, and personal information, and the contents of the service which can be offered are changed corresponding to the data.

This data may contain a small-scale game program which includes a simple lottery-like element such as a slot machine or lot drawing. The user enjoys the game. At the same time, a higher value than that of normal coupons will be given according to the results of the game, for example, when the slot machine hits a triple number such as "777." For example, while the user can get 100 coins at an amusement center with the normal coupon, he can get 200 coins with the triple number "777." Also, when the user wins a prize in a lottery, he/she may be allowed to get free admission to the amusement center or the discount rate of a passport ticket may be increased.

The user who has received a coupon brings his/her backup memory to various service providers. Concerning the service providers SSC1 and SSC2 in amusement center, for example, the service provider SSC1 establishes interconnection between the user's backup memory 113A and the service provider's backup memory 113B to conduct identification in the same manner as illustrated in FIG. 10.

By connecting the manager's backup memory 113B of the service provider SSC with the user's backup memory 113A, the backup memory 113B captures user data DIS1 and causes the user's backup memory 113A to display the contents of service DIS2 corresponding to the user information, and the service is thereby actually provided.

Moreover, it is possible to add some kind of recognition symbol to the user's backup memory 113A to indicate that the service has been received (DIS3).

In the same manner as shown in FIG. 10, by connecting the game device 100 of the service provider SSC with the user's backup memory 113A, the game device 100 captures the user information DIS1 and the service to allow the user to, for example, play a game once for free is thereby actually provided.

Furthermore, it is possible to add a recognition symbol to the user's backup memory 113A to indicate that the user wants to receive a service (DIS3).

On the screen to be displayed in the situation described above, the screen display DIS1 shows the user's ID and the number of times of use, the screen display DIS2 shows the contents of the service provided for the relevant coupon, and the screen display DIS3 shows a stamp space where a stamp is given every time the coupon is used. The graphic pattern of the screen display is changed according to the value of the coupon. The service provider SSC1 may provide a specified service on the basis of this screen display.

FIGS. 15A to 15C illustrate examples of the screen display changed according to the value of the coupon. A backup memory 113X displays "PRIZE COUPON," a backup memory 113Y displays "LUCKY COUPON," and a backup memory 113Z displays "SUPER COUPON."

When the number of coupon use times is displayed using stamps, the setting is made to enable repeated use of the coupon data. If the stamps are accumulated for a specified number of times, more advantageous services are provided, thereby encouraging the user to reuse the coupon. This means that the user of the game device can be made a loyal customer of various shops.

On the other hand, the service provider SSC2 has a connector 100B which can be connected to the user's backup memory 113. By using this connector 100B, a personal computer PC connects to the user's backup memory 113A. Access can be made from the personal computer through the network to the data supply center DSC where a customer database is stored. By referring to the information, the service provider SSC2 can provide not only the services corresponding to the coupon, but also the provider's original services, on the basis of the customer information. It is also possible to send coupon use data, which includes information about when and who, and how many times the coupons were used, to the data supply center DSC in real time.

The connector 100B displays, for example, the above-mentioned screen displays DIS1 to DIS3 according to the customer's personal information.

As an additional method of using the database generated here, it is possible to advertise products, for example, by e-mail, on the basis of the user information accumulated in the database, including age, sex, and hobbies, and to provide information, such as event information, required by the user.

As the service provider's power to attract customers is enhanced by means of the coupon issuing system and service, the following favorable cycle will be created: the number of shops which wish to become service providers will increase, the usage value of the coupon will be further increased, and the power to attract customers will be further enhanced.

It is also possible to actively deliver the coupon data to the user, for example, by e-mail, without waiting for the user to access the web page. In this case, it is possible to presume the user's tastes according to the web pages to which the user has accessed, and to deliver the coupon which suits the user's tastes.

When the user purchases products or sends the purchase fee over the Internet, it is possible to offer a service to automatically deliver the coupon data to the user.

Figure 16:
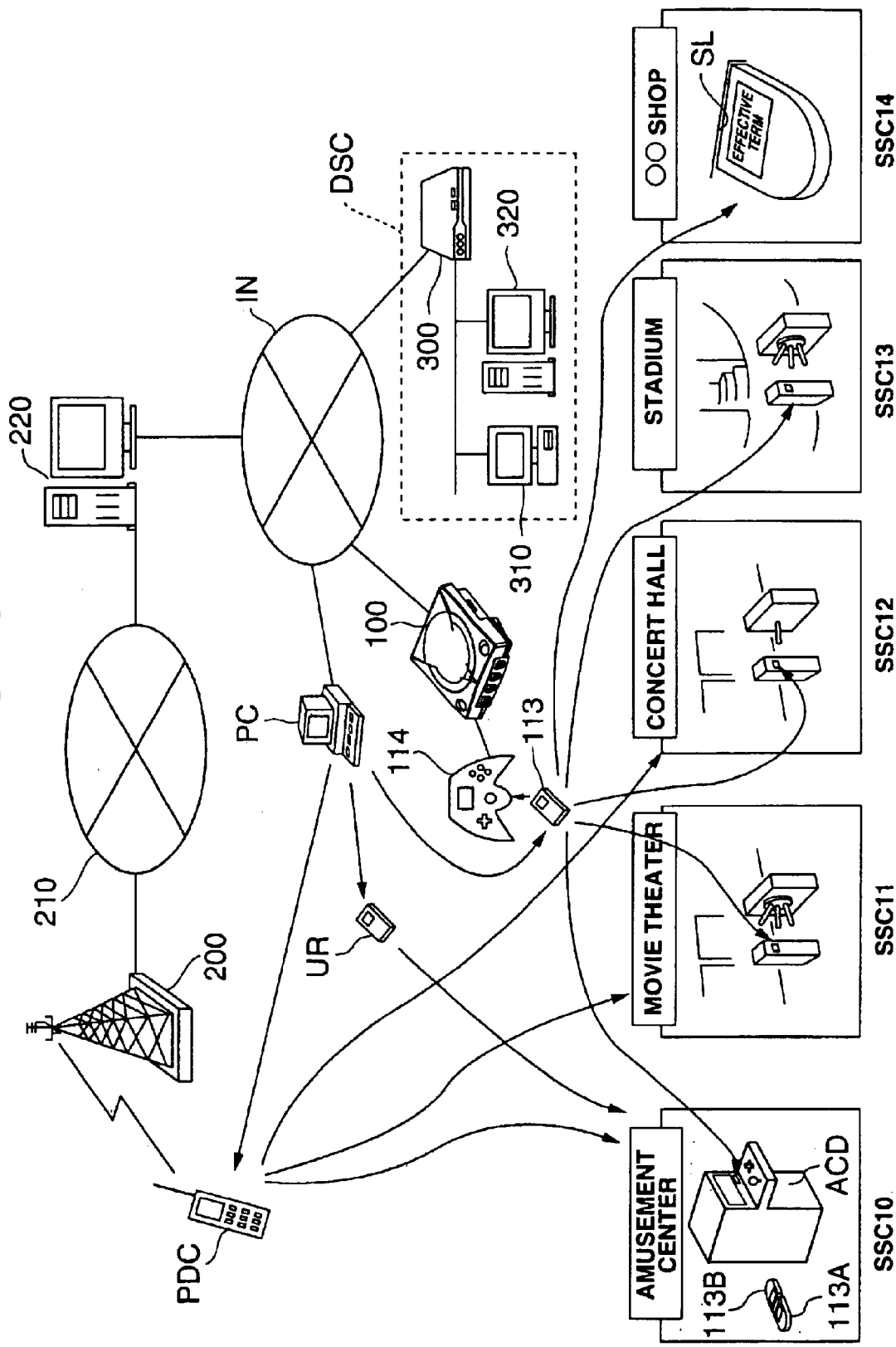
FIG. 16 is a block diagram illustrative of a relationship between the service ticket issuing system and a communication infrastructure.

FIG. 16 is a block diagram illustrative of a relationship between the service ticket issuing system and a communication infrastructure. The Internet IN is connected through an administrative server 220 to a packet transmission network 210. The packet transmission network 210 is further connected to a base station 200 of a movable body communication network. The base station 200 together with movable communication terminations such as the cellular phone PDC constitutes the movable body communication network.

When the cellular phone PDC is used, it can store the service ticket in its memory embedded therein. Therefore, it is easier to make full use of the service ticket in a wider range of applications than the case of using the backup memory. If the stored data is used to receive services on the Internet, there is no need to bring the service ticket to the service provider.

Instead of the cellular phone PDC, a removable disk of a personal computer may be used as the data carrier.

The Internet IN is connected to the data supply center DSC, the game device 100, and a personal computer PC. A controller 114 is connected to the game device 100. The backup memory 113 is connected to the controller 114 and downloads the service ticket data through the game device 100 and the Internet IN from the data supply center DSC.

The data supply center DSC comprises an administrative terminal 310, a game server 320, and a router 330.

In the same manner as illustrated in FIG. 14, the cellular phone PDC receives the data by means of communications, for example, through "i mode," with the base station 200 or downloads the data through, for example, a cable, directly from the personal computer PC connected to the Internet IN. It is also possible to use, as the data carrier, for example, a portable remote terminal UR capable of infrared data communication with the personal computer PC.

If the data carrier such as the backup memory 113, the cellular phone PDC, or the portable remote terminal UR is brought to various service providers such as an amusement center SSC10, a movie theater SSC11, a concert hall SSC12, and a stadium SSC13, a specified service is provided. The portable remote terminal UR capable of infrared data communication can conduct infrared data communication with the identifying means of service providers, thereby making the identification operation easier.

At a shop SSC14, a discount service for products can be offered with the coupon downloaded to the backup memory 113. The backup memory 113 is inserted into a slot SL of authentication equipment of the coupon, and the equipment sends data about the user and the coupon to the data supply center DSC. Authentication of the data is then conducted. If the data is authentic, the discount is given. It is also possible to set an effective term for the discount coupon. By setting the effective term, it is possible to stimulate the user's appetite for using the coupon.

The value of the coupon can be set in various ways as indicated in the following examples:

(c1) The value of the coupon is changed according to the number of times that the coupon of a specified series is downloaded.

(c2) The value of the coupon is changed according to, for example, the date and time of acquisition of the coupon.

(c3) The value of the coupon for the user who has made access is changed according to the total number of access times to the data supply center DSC.

(c4) The value of the coupon is changed according to the user's specific attributes such as the user's sex, age, zodiac sign of the year of his/her birth, constellation for fortune-telling, and initials of his/her name.

(c5) A discount rate for the coupon is changed according to, for example, the prices of products purchased by the user and the number of times of such purchase. For example, while a regular discount rate is 5%, a 10% discount rate is offered for the users who frequently purchase products. Specifically, with the backup memory 113 inserted into the communication terminal 114, the user purchases products at, for example, an electronic mall on the Internet and sends the coupon on demand from, for example, the electronic mall, and the discount service is thereby provided. The user's customer data is updated on the basis of this purchase data.

(c6) When the coupon is downloaded, the value of the coupon is changed at random, for example, by awarding special incentives as lucky coupon.

(c7) A combination of the above settings.

As described above, the use of the service ticket makes it possible to acquire information directly connected to the marketplace trends and to provide optimum services for each customer. Such services are provided regardless of time or place. On the other hand, it is possible to provide time-limited or location-limited services.

Embodiment 2

Figure 17:
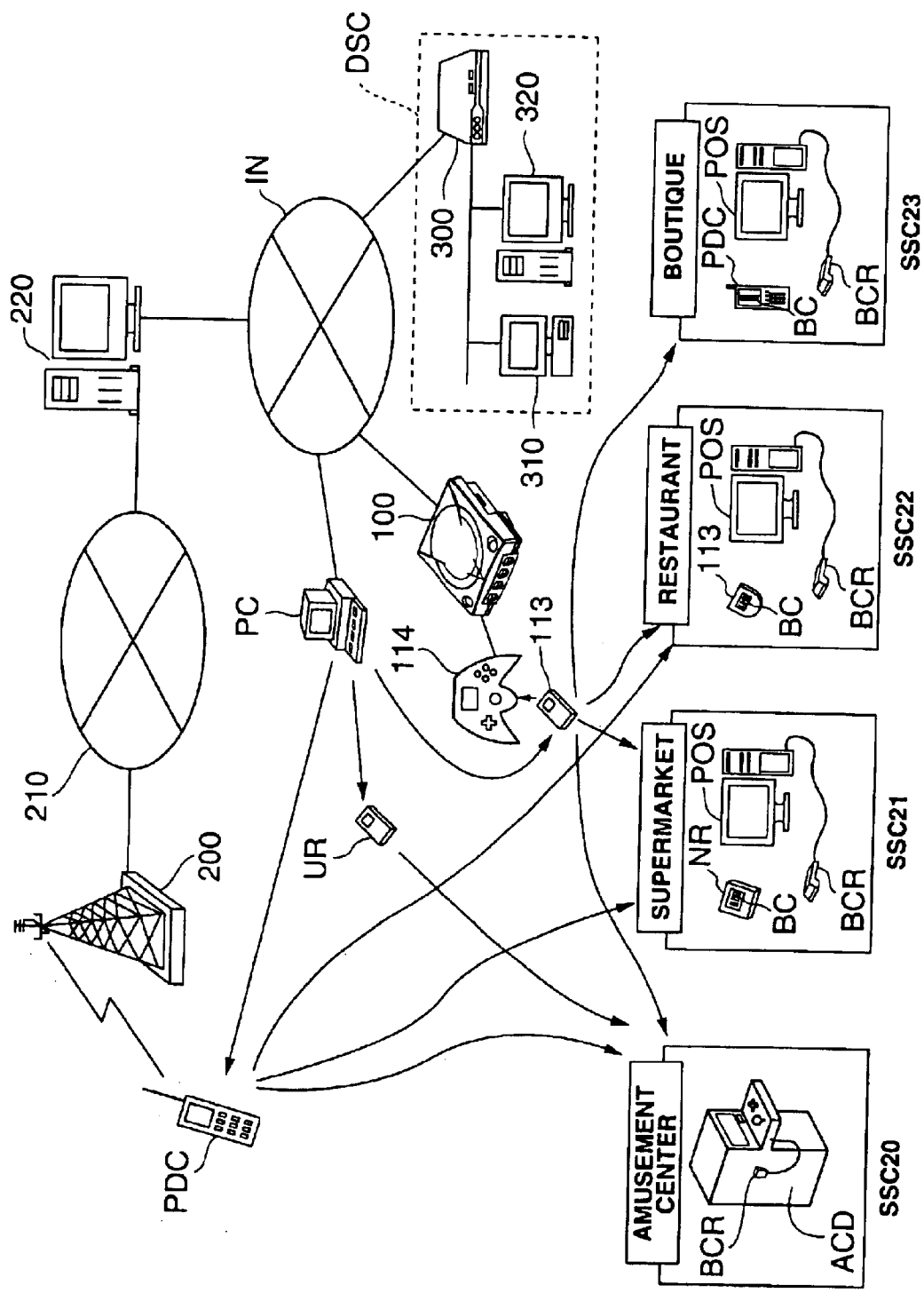
FIG. 17 is a block diagram illustrative of a relationship between the service ticket issuing system of Embodiment 2 and a communication infrastructure.

FIG. 17 is a block diagram similar to that of FIG. 16 and illustrates the service ticket issuing system of Embodiment 2 which uses a bar code BC. Elements in FIG. 17 which are the same as or correspond to those in FIG. 16 are given the same reference numerals as in FIG. 16, and any explanation thereof is omitted. The Internet IN is connected through an administrative server 220 to a packet communication network 210. The packet communication network 210 is further connected to a base station 200 of a movable body communication network. The base station 200 together with movable communication terminations such as the cellular phone PDC constitutes the movable body communication network.

The Internet IN is connected to the data supply center DSC, the game device 100, and a personal computer PC. A controller 114 is connected to the game device 100. The backup memory 113 is connected to the controller 114 and downloads the service ticket data through the game device 100 and the Internet IN from the data supply center DSC. The data supply center DSC comprises an administrative terminal 310, a game server 320, and a router 330.

In the same manner as illustrated in FIG. 16, the coupon is downloaded to the backup memory 113, the cellular phone PDC, the portable remote terminal UR, or the like, and such data carrier is brought to various service providers such as an amusement center SSC20, a supermarket SSC21, a restaurant SSC22, and a boutique SSC23.

At the service providers SSC20 to SSC23, the data carrier 113, PDC, or UR displays the bar code BC corresponding to the coupon, and the service providers have equipment comprising a bar code reader BCR. This equipment is a game device ACD or a POS terminal POS. The bar code reader is now widely used. By making full use of the bar code, the service ticket issuing system can become easily widespread. Moreover, since it is unnecessary to connect the data carrier to the equipment, the operation to authenticate the coupon can be conducted speedily.

When the information of the coupon or the user's ID is sent to the data supply center DSC, information about, for example, the purchased products, a combination of the purchased products, the volume of sales, and the amount of sales is also sent at the same time. This is important marketing information. For example, as shown in Table 1, if the purchased products are classified into specified product categories and if the higher-ranked product categories with regard to the amount of sales or the volume of sales are selected for each user, it is possible to increase efficiency in sales activities.

TABLE 1

Marketing Data

| User | Product Category | Average Unit Price | Volume of Sales | Amount of Sales |
|---|---|---|---|---|
| User A | AA | Aa | Naa | Saa |
|  | AB | Ab | Nab | Sab |
|  | AC | Ac | Nac | Sac |
| User B | BA | Ba | Nba | Sba |
|  | BB | Bb | Nbb | Sbb |
|  | BC | Bc | Nbc | Sbc |
| ... | ... | ... | ... | ... |
| User X | XA | Xa | Nxa | Sxa |
|  | XB | Xb | Nxb | Sxb |
|  | XC | Xc | Nxc | Sxc |

As shown in Table 2, it is also possible to conduct sales activities on the basis of intervals of purchase of the same products and combinations of products.

TABLE 2

Examples of Sales Activities

Sales Activities Based on Purchase Intervals

Conduct sales activities for each user by predicting the time when the products will be worn out.
Set the dates of bargain sale for each local area according to statistical data of product wearing-out time concerning a plurality of customers in each local area.
Control the intervals of purchase by the users by setting the volume of each product, and induce the users to visit the shops at most suitable time.
Control the intervals of purchase by the users by setting the volume of each products, and adjust the purchase amount for one visit by a user.
Control the intervals of purchase by the users by setting the volume of each product, and adjust the combinations of purchased products.

Sales Activities Based on Product Combinations

Set combinations of bargain-priced products according to statistical data of product combinations purchased by a plurality of users in each local area.
Set tie-in sales products according to statistical data of product combinations purchased by a plurality of users in each local area.

Figure 18:
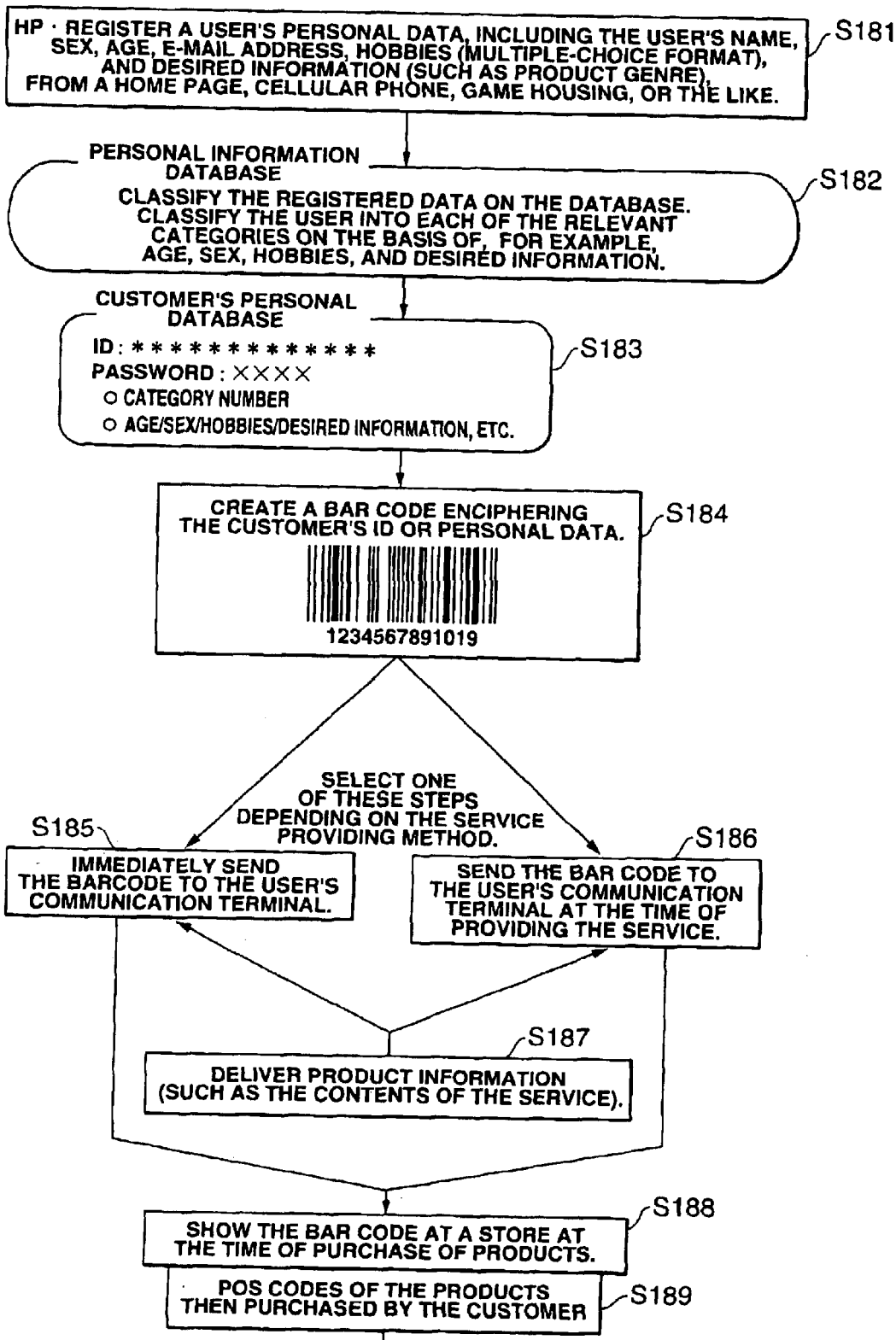
FIG. 18 is the first part of a flowchart which shows the processing required to acquire a coupon and user ID and the marketing technique based thereon.
Figure 19:
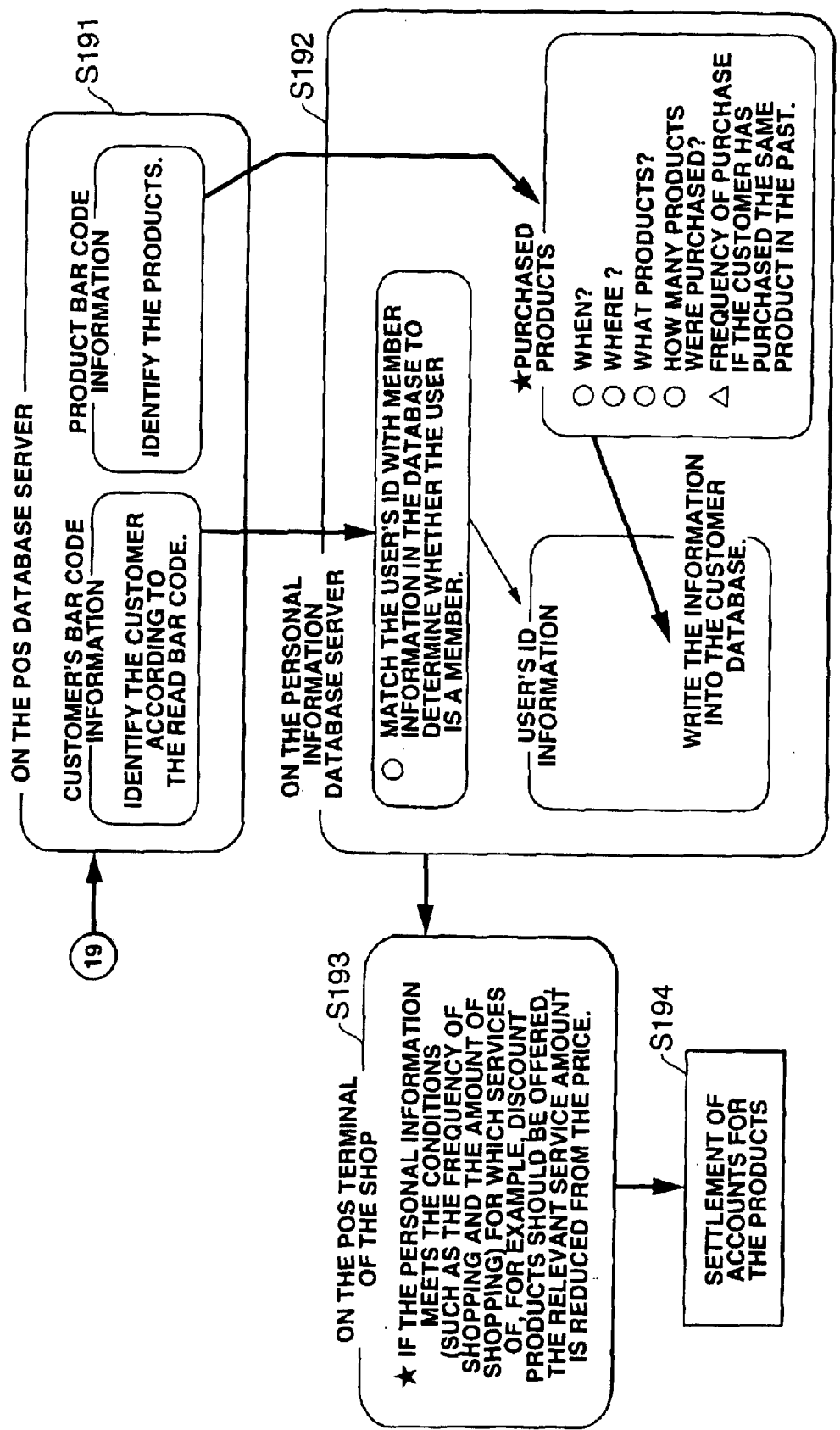
FIG. 19 is the latter part of the flowchart shown in FIG. 18.
Figure 20:
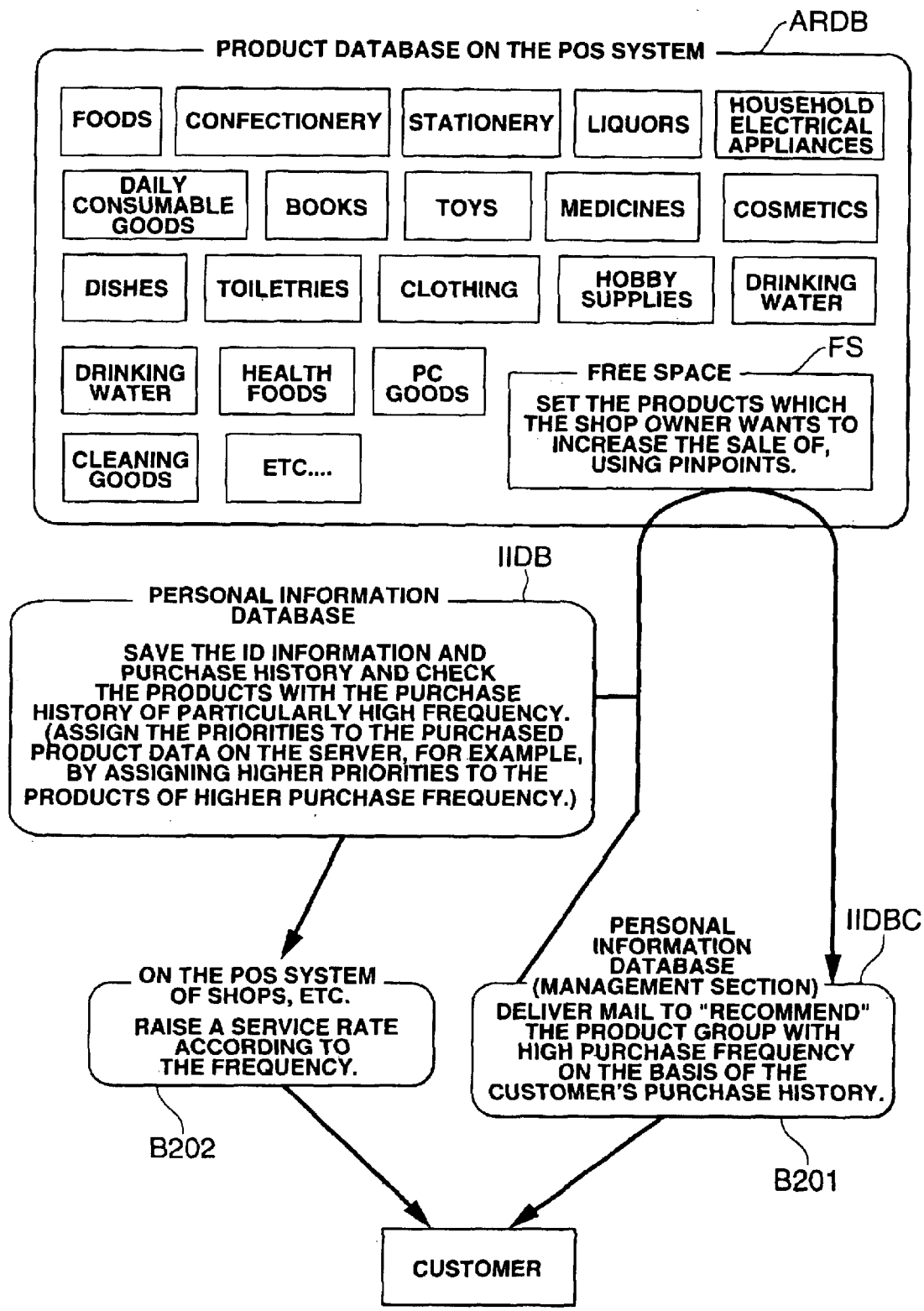
FIG. 20 is a block diagram illustrative of the method for using a product database for marketing.

FIGS. 18 to 20 are flowcharts illustrative of the processing to acquire the coupon and the user ID information and the marketing technique based thereon.

Each user makes access from the personal computer, cellular phone, game device, or the like to the web page and registers his/her personal data including his/her "name," "sex," "age," "e-mail address," "hobbies (multiple-choice format)," and "desired information (such as product genre)" (Step S181). This personal data is registered in a personal information database and is categorized on the basis of the age, sex, desired information, and so on (Step S182). The "categories" herein used mean groups of users having common hobbies or desired information. However, a category of much larger size is also defined appropriately, for example, the category of sex. The ID and password are issued with regard to the user's personal data and are registered in the database (Step S183) and a bar code is generated for each user (Step S184).

As a method for issuing the bar code to the user, it is possible to select either a method of sending the bar code to the communication terminal immediately after the registration (Step S185) or a method of sending the bar code to the communication termination at the time of providing the service (S186).

After the issuance of the bar code, product information (such as the contents of the service) is delivered to the user (Step S187).

Subsequently, if the user purchases products at a shop or other locations, he/she presents the bar code (Step S188), and POS codes and other information about the purchased products are sent to the data supply center DSC (Step S189).

A POS terminal at which the user has purchased the product identifies the user from the bar code information and identifies the products from the bar codes thereof (Step S191). This information is sent to the data supply center DSC, which is then matched with the user's ID to authenticate personal identification. Moreover, information about the date and time, place, number of products, amount of purchase, and whether or not similar products were purchased in the past is added to the information about the purchased products, and such information thereby obtained is then registered in the personal database (Step S192).

When the processing of Step S192 is finished at the data supply center DSC, the POS terminal is informed of the contents of the service and the service of, for example, discount prices is offered (Step S193). Finally, accounts of the products are settled (Step S194).

FIG. 20 illustrates the processing based on a product information database on the POS terminal. In the product information database ARDB, product categories of, for example, "food" and "confectionery" exist and one or more products are registered in each category. The product information database is further provided with a free space FS, and it is possible to set pinpoints at products which the shop owner wants to increase the sale of.

The data supply center is provided with a personal information database (indicated with the reference numeral IIDB), as well as its administrative part IIDBC. Accordingly, on the basis of the user's purchase history and the free space FS in the product information database ARDB, the data supply center DSC sends a "recommending" mail to introduce products to the user (processing block B201). Moreover, on the basis of the personal information database IIDB, a service is provided to, for example, increase a service rate with regard to products of high purchase frequency (processing block B202).

Figure 21:
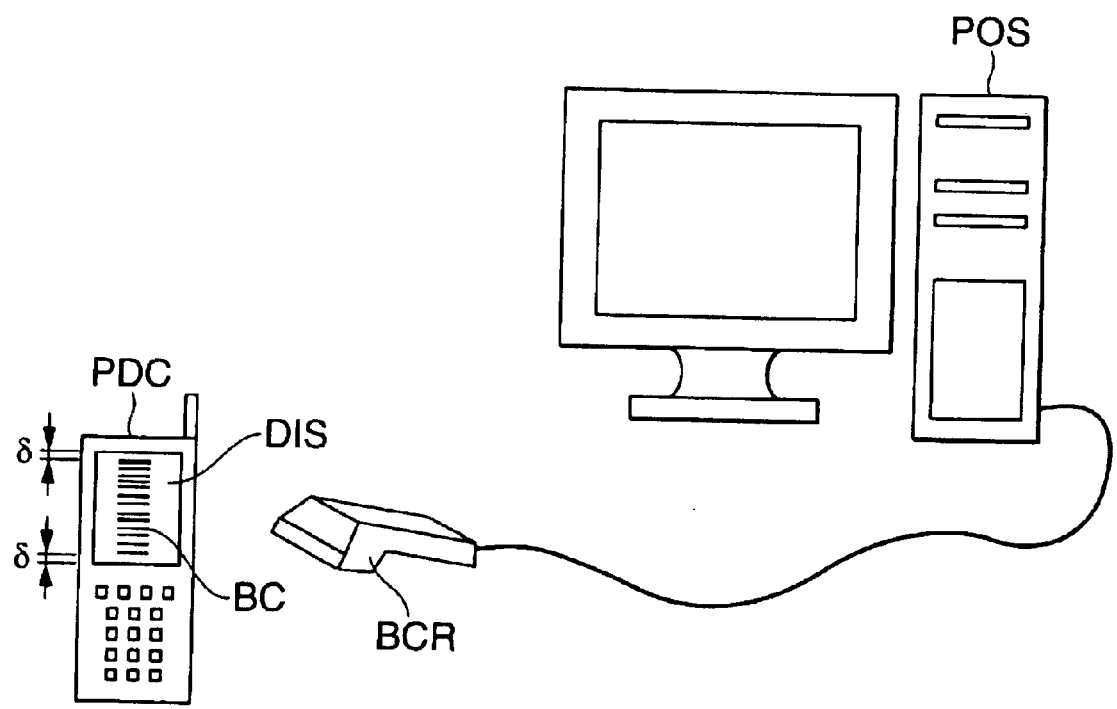
FIG. 21 is a front view of a data carrier and equipment of Embodiment 2.

FIG. 21 is an enlarged front view of the cellular phone PDC and the POS terminal POS. Concerning the bar code BC displayed on the cellular phone PDC, it is generally desirable that the bar code be aligned along the vertical length of a display screen DIS because of the shape of the display screen DIS. Since the display screen of the cellular phone is usually rectangular with its vertical length longer than its width, displaying the bar code along the length of the display screen will produce the effect of displaying the data volume.

There is a step height along the edge of the display screen DIS in contact with a casing, and the bar code reader BCR has difficulty in reading the edge of the display screen DIS. In order to secure the reading, a gap δ should be provided between the end of the bar code BC and the edge of the display screen DIS.

Figure 22:
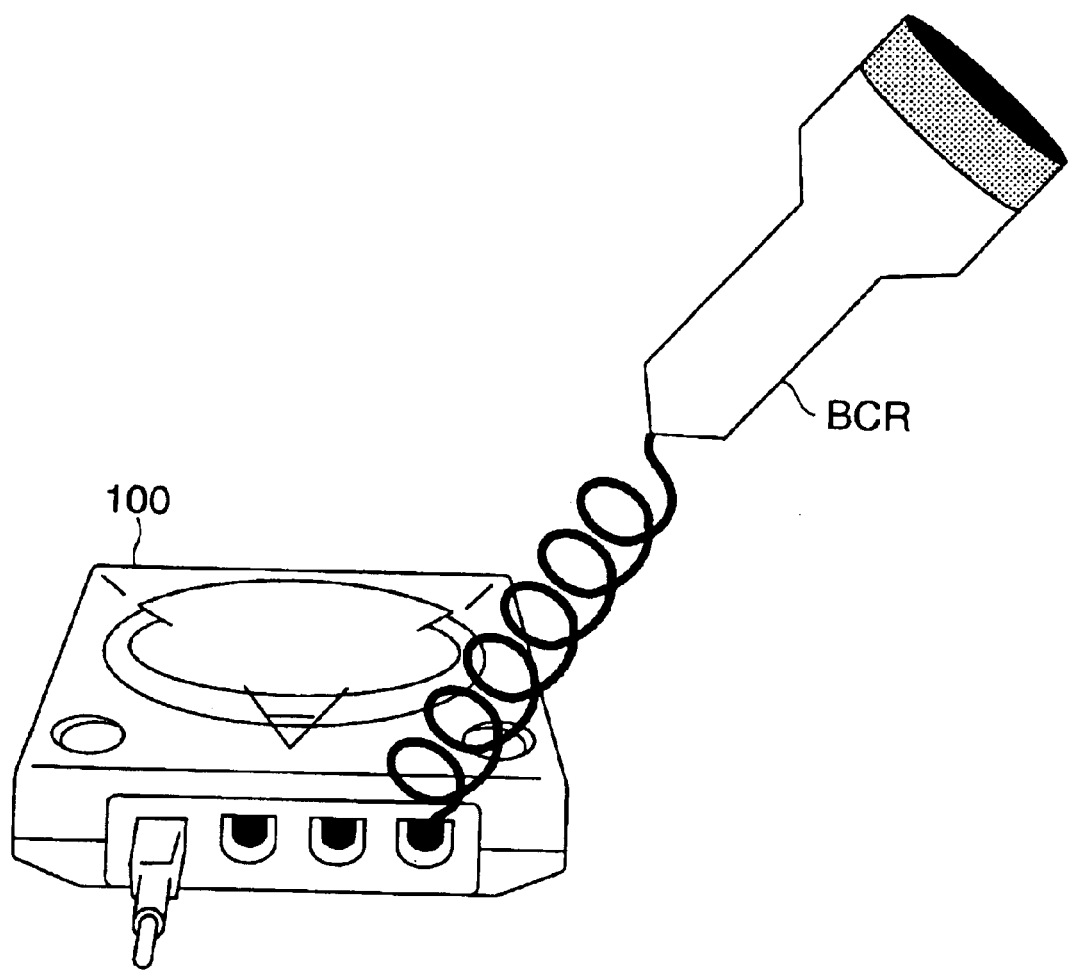
FIG. 22 is a perspective view of another data carrier and equipment of Embodiment 2.

FIG. 22 illustrates a structure in which the bar code reader BCR is connected to the game device 100. In the same manner as in FIG. 21, this structure makes it possible to read the bar code of the cellular phone PDC and to incorporate it into the game device 100.

Figure 23:
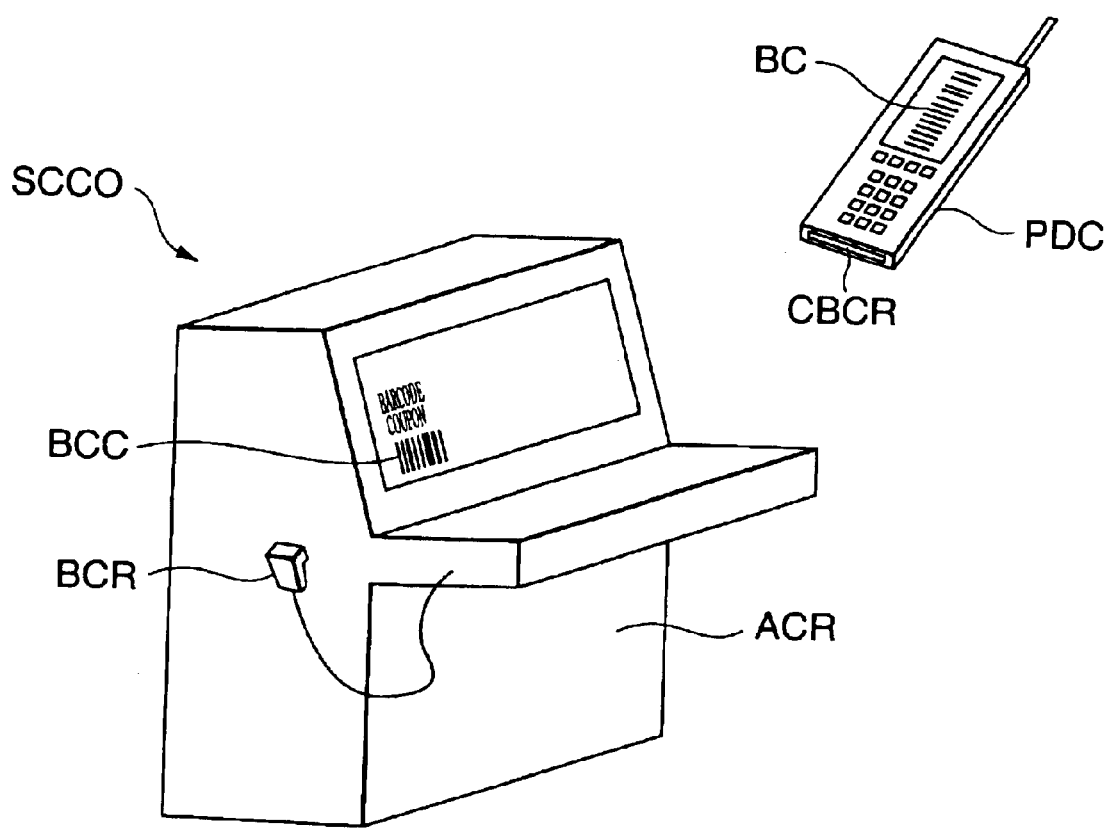
FIG. 23 is a perspective view of still another data carrier and equipment of Embodiment 2.

FIG. 23 illustrates a sample variation of the service ticket issuing system using the bar code. The cellular phone PDC as the data carrier is provided with a bar code reader CBCR, and a bar code BCC relating to the coupon is displayed on a display screen of equipment such as the game device ACR. The bar code BCC contains the information about the coupon that should be used at a service provider SCC0, and the data carrier PDC reads and records the information with the bar code reader CBCR. It is possible to know the contents of the coupon on the basis of this information and to download the coupon from the data supply center DSC. The settings with regard to the value of the coupon are similar to those of Embodiment 1.

Since the bar code BC can display various information, it is possible to simplify input into the game devices 100 and ACR by causing the data carrier such as the cellular phone PDC to display the user's personal data (such as age, date of birth, and birthplace) and by causing the bar code reader BCR to incorporate such personal data. The game device ACR sends the personal information to the data supply center DSC so that the personal information can be utilized for the management of the customer data and sales promotion.

In the variation examples, of FIGS. 22 and 23, it is possible to perform a game on the cellular phone PDC and to hand over the game to the game device 100 or ACR. Upon transferring the game, game data (such as the growth rate of characters, weapons, tools, personality, experience value, degree of progress, and the user's date of birth) is displayed by means of the bar code BC on the screen of the cellular phone PDC, and the bar code reader BCR is used to read the game data. The setting may be made so that a discount is given on game fees or some items are made available on the basis of the game data.

It is possible to cause the bar code BC to display the duration of calls and telephone bills of the cellular phone PDC, and to change the progress and contents of the game on the game device 100 or ACR on the basis of the duration of calls and telephone bills.

The user can manually input the bar code BC to be displayed on the cellular phone PDC. It is possible to change, for example, the availability of items, the progress of the game, the growth rate of characters, and the means is for attacking enemies, on the game device 100 or ACR by means of the bar code, thereby giving an entertaining feeling of the game to the bar code BC itself.

By causing the bar code BC of the game device 100 or ACR to display the game data and by causing the bar code reader CBCR of the cellular phone PDC to read the game data, it is possible to save the game data, to hand over the game data to the game device 100 ARC to be used next time and to other game devices or cellular phones PDC. Moreover, it is possible to make an entertaining setting, for example, by changing the degree of progress of the game on the cellular phone PDC.

The setting may be made so that a game contained in the cellular phone PDC can be used by causing the game device 100 or ARC to display the game data by means of the bar code BC and by causing the game data to be incorporated into the cellular phone. This is the use of the bar code as a key to open a sealed game.

By displaying individual parts, such as items, characters, and backgrounds, of the game of the game device 100 or ARC by means of the bar code BC and by causing the cellular phone PDC to read these parts, it is also possible to make these parts appear in the game on the cellular phone.

Figure 24:
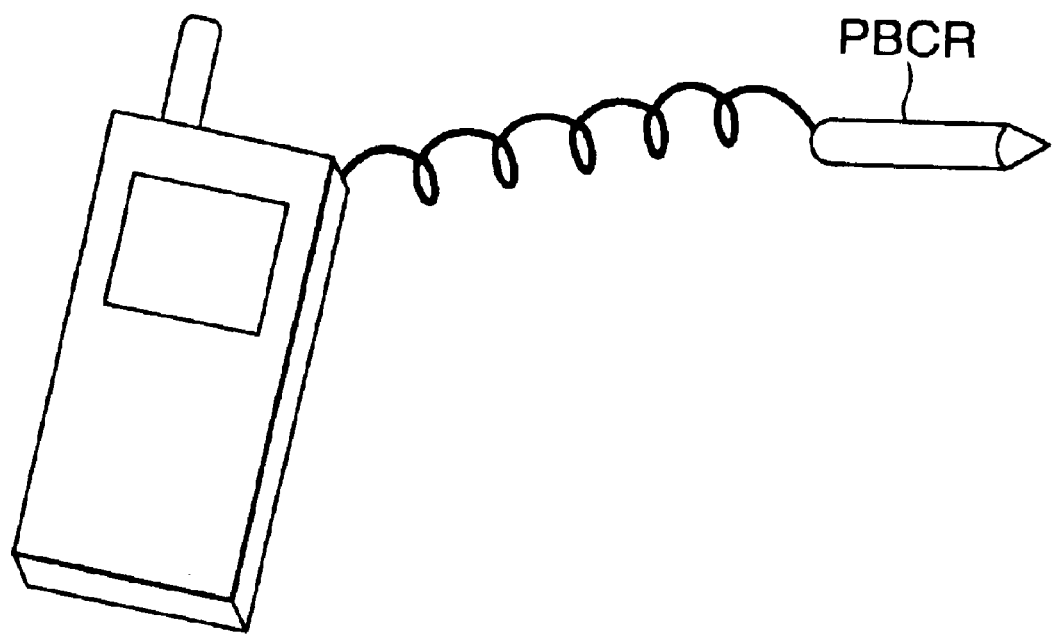
FIG. 24 is a perspective view of a further data carrier and equipment of Embodiment 2.

FIG. 24 illustrates a structure in which a pen-form reader PBCR is connected as the bar code reader for the cellular phone PDC. This structure can also produce the effects similar to those of the structure in FIG. 23.

The bar code reader CBCR or PBCR of the cellular phone PDC can also be used to read a bar code attached to a product, to create a personal product catalogue by acquiring the product information, and to extract the detailed data from the product database ARDB of the POS terminal on the basis of the bar code data. It is also possible to cause the cellular phone PDC to display the product data stored in the cellular phone PDC, and to cause the game device 100 or ARC to read the product data and access the barcode database, thereby enabling the display of the detailed product data.

Moreover, a service to demand a coupon is possible by causing the bar code reader CBCR or PBCR to read the bar code of the product and by immediately sending the bar code to the data supply center DSC. Since the data supply center can then acquire, for example, the user's personal information, the place of purchase, and the time of day, it can obtain marketing information. Concerning the delivery of the coupon, a questionnaire may be requested of the user and the coupon may be changed according to the answers in the questionnaire.

The bar code reader may be separated from the portable terminal, and communications may be conducted between the bar code reader and the portable terminal. Moreover, the bar code reader which can be connected to the portable terminal may be sold or leased at, for example, a shop, and the user may be required to input his/her personal information such as ID, at the time of starting of the bar code reader, thereby accumulating, managing, and making full use of the information.

When the cellular phone is used to read the bar code of the product, it is possible to make an entertaining setting by changing, for example, the items, story, growth rate of characters, and characters of the game on the cellular phone PDC on the basis of the bar code data.

Moreover, by causing the bar code to display, for example, the degree of progress and the growth rate of characters of the game on the cellular phone PDC and by causing the POS terminal to read the bar code data, such data maybe reflected in the service of, for example, product discounts.

As described above, it is possible to give and receive information rapidly and easily by making full use of the bar code in supplying data to the data carrier.

In the past, service providers have delivered their service data or advertisements to customers as necessary. However, utilization of the portable terminal and the reader as described above has such an advantageous effect that the customers themselves can request the service data or advertisements with regard to necessary products.

As stated above, by making full use of the bar code data, it is possible to acquire information directly connected to the marketplace trends and to provide optimum services for each customer. Such services are provided regardless of time or place. On the other hand, it is possible to provide time-limited or location-limited services.

According to this invention, it is possible to provide the service ticket issuing system and the service ticket issuing service to which the communication terminals of wider range can be applied.

What is claimed is:

1. A service providing system for providing a specified service by registering personal information of a user at a server by utilizing a portable terminal associated with the user,
wherein the server comprises:
a personal database for registering the personal information sent from the portable terminal;
means for creating an electronic coupon bar code by presuming tastes of the user according to the personal information registered in the personal database, by preparing the electronic coupon content that suits the tastes and by encoding the prepared electronic coupon content; and
means for delivering image data, including the electronic coupon bar code, to the portable terminal,
wherein the portable terminal comprises a storage means for storing the delivered image data and a displaying means for displaying the image data,
wherein an information processing terminal having a bar code reader reads, using its bar code reader, the electronic coupon bar code contained in the image data displayed on the display means of the portable terminal, recognizes the electronic coupon content according to the electronic coupon bar code that has been read, performs the necessary processing to provide a service according to the recognized electronic coupon content, and sends new personal information generated by the service to the server so that the new personal information is reflected in the electronic coupon content for the next delivery, and
wherein the server is configured to specify the electronic coupon content for the next delivery based upon a purchase history of the user or a data access history by the user registered in the personal database, so that a service of a different value will be provided with regard to a product having a high purchase frequency or with regard to a service having a high access associated with the user.

2. The service providing system according to claim 1,
wherein the server has a product information database for registering specified information according to a plurality of products,
wherein the means for creating the electronic coupon bar code creates an electronic coupon bar code including a user ID code for the user,
wherein the information processing terminal specifies the user by reading, using its bar code reader, the electronic coupon bar code displayed on the display means of the portable terminal, and specifies a product selected by the user by using the bar code reader, and sends information about the selected product according to the specified user and product, and
wherein the server registers the received information about the selected product, and presumes the tastes according to the purchase history of the user so that said presumption of the tastes is reflected in the electronic coupon content for the next delivery.

3. A machine readable storage medium having a program stored therein for causing a computer to download data in the service providing system according to claim 1 or 2.

4. The service providing system according to claim 2, wherein the server is configured to specify the electronic coupon content for next delivery on the basis of the information, which is registered in the product information database, regarding products for which a seller wants to increase sales, and on the basis of the purchase history in the personal database.

5. The service providing system according to claim 2, wherein when the received bar code of the product purchased by the user corresponds to an identification of a previously determined discount product, the server notifies the information processing terminal of an electronic coupon bar code to allow application of the discount to the price of the product purchased by the user.

6. A server for sending a bar code representing a specified electronic coupon content to a portable terminal,
wherein the server comprises:
a personal database for registering personal information of a user sent from the portable terminal;
means for creating an encoded electronic coupon bar code by presuming tastes of the user according to the personal information registered in the personal database, by preparing the electronic coupon content that suits the tastes, and by encoding the produced electronic coupon content; and
means for delivering image data, including the electronic coupon bar code, to the portable terminal,
wherein when an information processing terminal having a bar code reader reads, using the bar code reader, the electronic coupon bar code contained in the image data displayed on a display means of the portable terminal, recognizes, according to the electronic coupon bar code, the electronic coupon content that suits the tastes, performs the necessary processing to provide a service according to the electronic coupon content that suits the tastes, and sends new personal information generated by the service to the server, the server updates the personal database based on the new personal information of the user and specifies the electronic coupon content for the next delivery according to the updated new personal information of the user, and
wherein the server is configured to specify the electronic coupon content for the next delivery based upon a purchase history of the user or a data access history by the user registered in the personal database, so that a service of a different value will be provided with regard to a product having a high purchase frequency or with regard to a service having a high access associated with the user.

7. The server according to claim 6, comprising a product information database for registering specified information according to a plurality of products,
wherein the means for creating the electronic coupon bar code creates the encoded electronic coupon bar code that specifies the user according to the personal information,
wherein when the information processing terminal specifies the user according to the electronic coupon bar code displayed on the display means, and specifies a product selected by the user by reading, with the bar code reader, the bar code of the product selected by the user, and sends the information about the product purchased by the specified user to the server, the server registers the received information about the purchased product in the personal database, and presumes the tastes according to the purchase history so that such presumption of the tastes is reflected in the electronic coupon content for the next delivery.

8. The server according to claim 7, wherein the server specifies the electronic coupon content for a next delivery on the basis of the information, which is registered in the product information database, regarding products for which a seller wants to increase the sales, and on the basis of the purchase history registered in the personal database.

9. The server according to claim 7, wherein when the received bar code of the product purchased by the user corresponds to an ID code of a previously determined discount product, the server notifies the information processing terminal of the electronic coupon bar code to allow the discount on the price of the product purchased by the user.

10. A service providing method for providing a specified electronic coupon by registering personal information of a user at a server by utilizing a portable terminal,
wherein the method comprises the steps of:
registering the personal information sent from the portable terminal in a personal database;
creating an encoded electronic coupon bar code by presuming tastes of the user according to the personal information registered in the personal database, by specifying specific electronic coupon content that suits the tastes, and then by encoding the specified electronic coupon content; and
delivering image data, including the electronic coupon bar code, to the portable terminal,
wherein delivering comprises storing the delivered image data in and displaying the image data on the portable terminal,
wherein an information processing terminal having a bar code reader reads, with its bar code reader, the electronic coupon bar code contained in the image data displayed on the portable terminal, recognizes, the electronic coupon bar code, performs the necessary processing to provide a service according to the recognized electronic coupon content, and sends new personal information generated by the service to the server so that the new personal information is reflected in the electronic coupon content for a next delivery, and
wherein the server is configured to specify the electronic coupon content for the next delivery based upon a purchase history of the user or a data access history by the user registered in the personal database, so that a service of a different value will be provided with regard to a product having a high purchase frequency or with regard to a service having a high access associated with the user.

11. The service providing method according to claim 10, wherein the method comprises the step of registering specified information according to a plurality of products in a product information database, and the step of creating an encoded electronic coupon bar code to specify the user according to the personal information,
wherein the information processing terminal specifies the user according to the electronic coupon bar code displayed on the display means, and specifies a product selected by the user by reading, with the bar code reader, the bar code of the product selected by the user, and sends information about the product purchased by the specified user to the server, and
wherein the server registers the received information about the purchased product, and presumes the tastes according to the purchase history so that such presumption of the tastes is reflected in the electronic coupon content for next delivery.

12. A service providing system for providing a specified service by registering personal information of a user at a server by utilizing a portable terminal of the user,
wherein the server comprises:
a personal database for registering the personal information sent from the portable terminal;
means for creating an electronic coupon bar code by specifying specific electronic coupon content according to the personal information registered in the personal database; and by encoding the specified electronic coupon content; and
means for delivering image data, including the electronic coupon bar code, to the portable terminal, wherein the portable terminal comprises storage means for storing the delivered image data and display means for displaying the image data, wherein an information processing terminal having a bar code reader reads, with its bar code reader, the electronic coupon bar code contained in the image data displayed on the display means of the portable terminal, recognizes the specified user and electronic coupon content according to the bar code, and performs the necessary processing to provide a service according to the electronic coupon content, and wherein the server is configured to specify the electronic coupon content for the next delivery based upon a purchase history of the user or a data access history by the user registered in the personal database, so that a service of a different value will be provided with regard to a product having a high purchase frequency or with regard to a service having a high access associated with the user.

13. A service providing system capable of conducting communication between a portable terminal of a user and a server through a communication line, wherein the server comprises means for creating an electronic coupon bar code by specifying specific electronic coupon content and means for delivering image data, including the electronic coupon bar code, to the portable terminal, and wherein the portable terminal comprises:
  means for receiving the delivered image data;
  means for storing the received image data; and
  means for displaying the image data, wherein an information processing terminal having a bar code reader reads, with its bar code reader, the electronic coupon bar code contained in the image data displayed on the display means of the portable terminal, recognizes the electronic coupon content according to the electronic coupon bar code, and performs the necessary processing to provide a service according to the recognized electronic coupon content;

wherein the server is configured to specify the electronic coupon content for the next delivery based upon a purchase history of the user or a data access history by the user registered in the personal database, so that a service of a different value will be provided with regard to a product having a high purchase frequency or with regard to a service having a high access associated with the user; and wherein the image data is automatically delivered based upon a history of the internet web pages accessed by the user or actively delivered to the user without waiting for the user to access the web pages.

14. A service providing system for providing a specified service at an information processing terminal by registering personal information of a user at the server by utilizing a portable terminal, wherein the server comprises:
  a first personal database for registering the personal information sent from the portable terminal;
  a second personal database for registering the purchase history information sent from the information processing terminal;
  a product information database for registering information about a product;
  means for creating a membership bar code by encoding the personal information registered in the first personal database;
  a delivery means for delivering image data including the membership bar code to the portable terminal;

wherein the portable terminal comprises means for storing the delivered image data and means for displaying the image data, and wherein the information processing terminal having a bar code reader recognizes the personal information by reading, with the bar code reader, the membership bar code contained in the image data displayed on the display means of the portable terminal, recognizes product information by reading, with the bar code reader, the bar code of the product selected by the user and sends the purchase history information including the personal information and the product information to the server, wherein the server registers the received purchase history information in the second personal database, specifies, among the product information database, the service content regarding the product contained in the purchase history information, and sends the specified service content to the information processing terminal, wherein the information processing terminal performs processing according to the received service content with regard to the product selected by the user, and wherein the server is configured to specify the electronic coupon content for the next delivery based upon a purchase history of the user or a data access history by the user registered in the personal database, so that a service of a different value will be provided with regard to a product having a high purchase frequency or with regard to a service having a high access associated with the user.

15. The server according to claim 14, wherein the server presumes the tastes according to the personal information registered in the first personal database and the purchase history information stored in the second personal database, specifies, among the product information database, the product that suits the presumed tastes, and delivers information about the specified product via e-mail to the portable terminal.

16. The server according to claim 14, wherein when the tastes are presumed according to the personal information registered in the first personal database and the purchase history information stored in the second personal database, and when the product contained in the received purchase history information is the product that suits the presumed tastes, the server changes the service content specified among the product information database to the content more advantageous to the user, and then sends such changed content to the information processing terminal.

17. A service providing system for providing a specified service via an information processing terminal by registering personal information of a user at a server by utilizing a portable terminal, wherein the server comprises:
  a personal database for registering the user's personal information sent from the portable terminal;
  means for creating a membership bar code by encoding the personal information registered in the personal database; and
  delivery means for delivering image data including the membership bar code to the portable terminal, wherein the portable terminal comprises means for storing the delivered image data and means for displaying the image data, and wherein the information processing terminal having a bar code reader recognizes the user by reading, with the bar code reader, the membership bar code contained in the image data displayed on the display means of the portable terminal, performs the necessary processing to provide a service or a product selected by the user, and sends new personal information generated by the service to the server, and wherein the server is configured to specify a service content for the next delivery on the basis of a data access history of the service received by the user or a purchase history of the product purchased by the user which is registered in the personal database, so that a better service rate will be provided with regard to the service having a high access associated with the user or the product having a high purchase frequency.

* * * * *